United States Patent
Luo

(10) Patent No.: US 8,765,887 B2
(45) Date of Patent: Jul. 1, 2014

(54) PROCESS AND CATALYST SYSTEM FOR POLYDIENE PRODUCTION

(75) Inventor: Steven Luo, Copley, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 13/391,463

(22) PCT Filed: Aug. 24, 2010

(86) PCT No.: PCT/US2010/046482
§ 371 (c)(1),
(2), (4) Date: Mar. 16, 2012

(87) PCT Pub. No.: WO2011/028523
PCT Pub. Date: Mar. 10, 2011

(65) Prior Publication Data
US 2012/0165484 A1 Jun. 28, 2012

Related U.S. Application Data

(60) Provisional application No. 61/236,168, filed on Aug. 24, 2009.

(51) Int. Cl.
*C08F 4/52* (2006.01)
*C08F 4/58* (2006.01)
*C08F 136/04* (2006.01)
*C08F 136/06* (2006.01)
*C08F 36/04* (2006.01)
*C08F 36/06* (2006.01)
*C08F 4/54* (2006.01)

(52) U.S. Cl.
CPC . *C08F 4/545* (2013.01); *C08F 4/52* (2013.01); *C08F 4/58* (2013.01); *C08F 36/04* (2013.01); *C08F 136/04* (2013.01); *C08F 36/06* (2013.01); *C08F 136/06* (2013.01)
USPC ......................................................... 526/164

(58) Field of Classification Search
CPC .............. C08F 4/545; C08F 4/52; C08F 4/58; C08F 136/04; C08F 136/06
USPC ......................................................... 526/164
IPC .................................................. C08F 4/52, 4/58
See application file for complete search history.

(56) References Cited

U.S. PATENT DOCUMENTS

| | | | | |
|---|---|---|---|---|
| 6,075,092 | A * | 6/2000 | Nakamura et al. | 525/122 |
| 6,130,299 | A * | 10/2000 | Sone et al. | 526/89 |
| 6,492,476 | B1 * | 12/2002 | Knauf et al. | 526/164 |
| 7,053,159 | B2 * | 5/2006 | Inoue et al. | 526/161 |

(Continued)

FOREIGN PATENT DOCUMENTS

EP        1939221 A2    7/2008

OTHER PUBLICATIONS

Shin, Jin Sup, Apr. 25, 2011 International Search Report with Written Opinion from PCT/US2010/046482 (10 pp.).

*Primary Examiner* — Brieann R Fink
(74) *Attorney, Agent, or Firm* — Meredith E. Hooker; Arthur M. Reginelli

(57) ABSTRACT

A process for preparing a polydiene, the process comprising the step of polymerizing conjugated diene monomer with a lanthanide-based catalyst system in the presence of a vinylsilane, an allylsilane, or an allylvinylsilane.

26 Claims, 7 Drawing Sheets

(56) References Cited

U.S. PATENT DOCUMENTS

| | | |
|---|---|---|
| 2002/0026013 A1 | 2/2002 | Lundquist et al. |
| 2007/0149728 A1 | 6/2007 | Vestberg |
| 2008/0146745 A1 | 6/2008 | Luo et al. |

* cited by examiner

PROCESS AND CATALYST SYSTEM FOR POLYDIENE PRODUCTION

This application claims the benefit of U.S. Provisional Patent Application Ser. No. 61/236,168, filed on Aug. 24, 2009, which is incorporated herein by reference.

FIELD OF THE INVENTION

One or more embodiments of the present invention relate to processes for producing polydienes and lanthanide-based catalyst systems useful in polydiene production processes.

BACKGROUND OF THE INVENTION

Catalyst systems comprising lanthanide compounds are known to be useful for polymerizing conjugated dienes. These catalyst systems can be stereospecific and, to some extent, can selectively produce cis-1,4-polydienes or trans-1,4-polydienes, depending on the specific catalyst system. For example, a catalyst system including a lanthanide-containing compound, an alkylating agent, and a halogen-containing compound can be useful in producing cis-1,4-polydienes from various conjugated diene monomers. These catalyst systems are also capable of copolymerizing different types of conjugated diene monomers to give stereoregular cis-1,4-copolydienes.

Cis-1,4-polydienes produced by lanthanide-based catalyst systems have a linear backbone structure and exhibit good green strength and excellent viscoelastic properties. The linear backbone structure is believed to improve the tensile properties and abrasion and fatigue resistance, and to reduce hysteresis loss of rubber compounds. Therefore, these polydienes are particularly suited for use in tire components, such as sidewall and tread. Despite advances, however, catalyst systems to produce improved polydienes are still desired.

SUMMARY OF THE INVENTION

Figure 1:
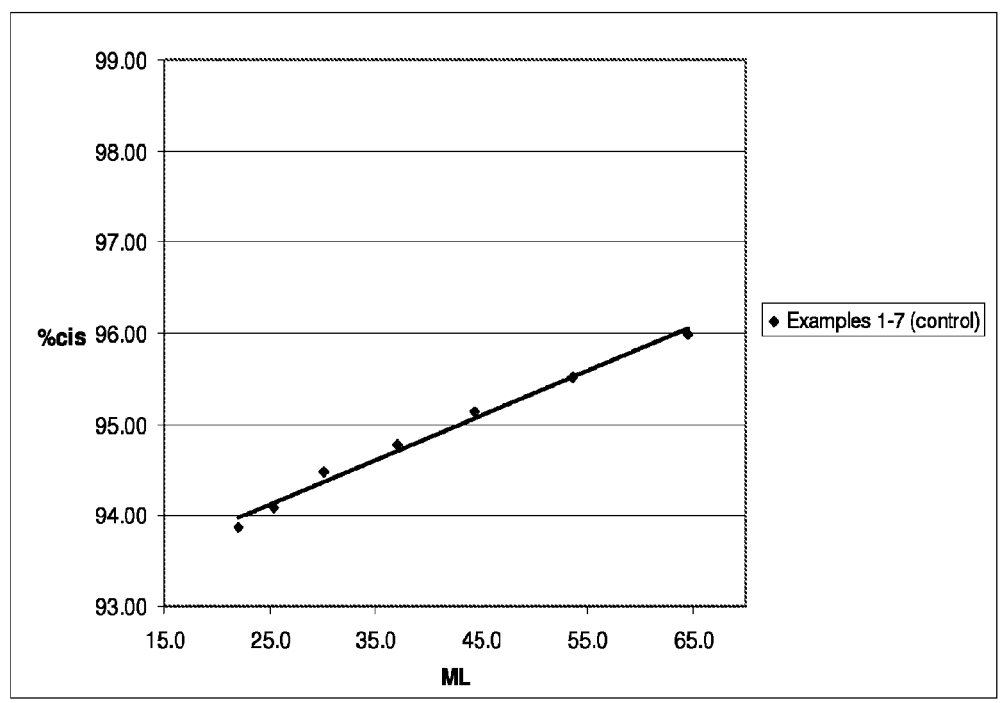
FIG. 1 is a graphical plot of the cis-1,4-linkage content versus Mooney viscosity ($ML_{1+4}$ @100° C.) for cis-1,4-polybutadiene polymer made in the absence of a silane compound.

Embodiments of the present invention provide a process for preparing a polydiene, the process comprising the step of polymerizing conjugated diene monomer with a lanthanide-based catalyst system in the presence of a vinylsilane, an allylsilane, or an allylvinylsilane.

Other embodiments of the present invention provide a process for preparing a polydiene, the process comprising the step of polymerizing conjugated diene monomer with a catalyst system including the combination of or reaction product of (a) a lanthanide compound, (b) an alkylating agent, (c) a halogen source, and (d) a silane selected from the group consisting of a vinylsilane, an allylsilane, and an allylvinylsilane.

Still other embodiments of the present invention provide a process for preparing a polydiene, the process comprising the step of introducing (a) a lanthanide compound, (b) an alkylating agent, (c) a halogen source, (d) a vinylsilane, an allylsilane, or an allylvinylsilane, and (e) conjugated diene monomer.

Still other embodiments of the present invention provide a catalyst system comprising the combination of or reaction product of (a) a lanthanide compound, (b) an alkylating agent, (c) a halogen source, (d) a vinylsilane, an allylsilane, or an allylvinylsilane, and optionally (e) conjugated diene monomer.

Still other embodiments of the present invention provide a cis-1,4-polydiene prepared by a process comprising the step of polymerizing conjugated diene monomer with a lanthanide-based catalyst system including the combination of or reaction product of (a) a lanthanide compound, (b) an alkylating agent, (c) a halogen source, and (d) a vinylsilane, an allylsilane, or an allylvinylsilane.

DETAILED DESCRIPTION OF ILLUSTRATIVE EMBODIMENTS

According to one or more embodiments of the present invention, polydienes are produced by polymerizing conjugated diene monomer with a lanthanide-based catalyst system in the presence of a vinylsilane, an allylsilane, and/or an allylvinylsilane. The presence of the vinylsilane, allylsilane, or allylvinylsilane has been found to advantageously increase the cis-1,4-linkage content of the resulting polydiene as compared to polydienes produced in the absence of the vinylsilane, allylsilane or allylvinylsilane.

Practice of the present invention is not necessarily limited by the selection of any particular lanthanide-based catalyst system. In one or more embodiments, the catalyst systems of the present invention include (a) a lanthanide-containing compound, (b) an alkylating agent, (c) a halogen source, and (d) a vinylsilane, allylsilane, and/or allylvinylsilane. In other embodiments, a compound containing a non-coordinating anion or a non-coordinating anion precursor can be employed in lieu of a halogen source. In these or other embodiments, other organometallic compounds, Lewis bases, and/or catalyst modifiers can be employed in addition to the ingredients or components set forth above. For example, in one embodiment, a nickel-containing compound can be employed as a molecular weight regulator as disclosed in U.S. Pat. No. 6,699,813, which is incorporated herein by reference in its entirety.

As mentioned above, the catalyst systems of the present invention can include at least one lanthanide-containing compound. Lanthanide-containing compounds useful in the present invention are those compounds that include at least one atom of lanthanum, neodymium, cerium, praseodymium, promethium, samarium, europium, gadolinium, terbium, dysprosium, holmium, erbium, thulium, ytterbium, lutetium, and didymium. In one embodiment, these compounds can include neodymium, lanthanum, samarium, or didymium. As used herein, the term "didymium" shall denote a commercial mixture of rare-earth elements obtained from monazite sand. In addition, the lanthanide-containing compounds useful in the present invention can be in the form of elemental lanthanide.

The lanthanide atom in the lanthanide-containing compounds can be in various oxidation states including, but not limited to, the 0, +2, +3, and +4 oxidation states. In one embodiment, a trivalent lanthanide-containing compound, where the lanthanide atom is in the +3 oxidation state, can be employed. Suitable lanthanide-containing compounds include, but are not limited to, lanthanide carboxylates, lanthanide organophosphates, lanthanide organophosphonates, lanthanide organophosphinates, lanthanide carbamates, lanthanide dithiocarbamates, lanthanide xanthates, lanthanide β-diketonates, lanthanide alkoxides or aryloxides, lanthanide halides, lanthanide pseudo-halides, lanthanide oxyhalides, and organolanthanide compounds.

In one or more embodiments, the lanthanide-containing compounds can be soluble in hydrocarbon solvents such as aromatic hydrocarbons, aliphatic hydrocarbons, or cycloaliphatic hydrocarbons. Hydrocarbon-insoluble lanthanide-containing compounds, however, may also be useful in the present invention, as they can be suspended in the polymerization medium to form the catalytically active species.

For ease of illustration, further discussion of useful lanthanide-containing compounds will focus on neodymium compounds, although those skilled in the art will be able to select similar compounds that are based upon other lanthanide metals.

Suitable neodymium carboxylates include, but are not limited to, neodymium formate, neodymium acetate, neodymium acrylate, neodymium methacrylate, neodymium valerate, neodymium gluconate, neodymium citrate, neodymium fumarate, neodymium lactate, neodymium maleate, neodymium oxalate, neodymium 2-ethylhexanoate, neodymium neodecanoate (a.k.a., neodymium versatate), neodymium naphthenate, neodymium stearate, neodymium oleate, neodymium benzoate, and neodymium picolinate.

Suitable neodymium organophosphates include, but are not limited to, neodymium dibutyl phosphate, neodymium dipentyl phosphate, neodymium dihexyl phosphate, neodymium diheptyl phosphate, neodymium dioctyl phosphate, neodymium bis(1-methylheptyl) phosphate, neodymium bis (2-ethylhexyl) phosphate, neodymium didecyl phosphate, neodymium didodecyl phosphate, neodymium dioctadecyl phosphate, neodymium dioleyl phosphate, neodymium diphenyl phosphate, neodymium bis(p-nonylphenyl) phosphate, neodymium butyl (2-ethylhexyl) phosphate, neodymium (1-methylheptyl) (2-ethylhexyl) phosphate, and neodymium (2-ethylhexyl) (p-nonylphenyl) phosphate.

Suitable neodymium organophosphonates include, but are not limited to, neodymium butyl phosphonate, neodymium pentyl phosphonate, neodymium hexyl phosphonate, neodymium heptyl phosphonate, neodymium octyl phosphonate, neodymium (1-methylheptyl) phosphonate, neodymium (2-ethylhexyl) phosphonate, neodymium decyl phosphonate, neodymium dodecyl phosphonate, neodymium octadecyl phosphonate, neodymium oleyl phosphonate, neodymium phenyl phosphonate, neodymium (p-nonylphenyl) phosphonate, neodymium butyl butylphosphonate, neodymium pentyl pentylphosphonate, neodymium hexyl hexylphosphonate, neodymium heptyl heptylphosphonate, neodymium octyl octylphosphonate, neodymium (1-methylheptyl) (1-methylheptyl)phosphonate, neodymium (2-ethylhexyl) (2-ethylhexyl)phosphonate, neodymium decyl decylphosphonate, neodymium dodecyl dodecylphosphonate, neodymium octadecyl octadecylphosphonate, neodymium oleyl oleylphosphonate, neodymium phenyl phenylphosphonate, neodymium (p-nonylphenyl) (p-nonylphenyl)phosphonate, neodymium butyl (2-ethylhexyl)phosphonate, neodymium (2-ethylhexyl) butylphosphonate, neodymium (1-methylheptyl) (2-ethylhexyl)phosphonate, neodymium (2-ethylhexyl) (1-methylheptyl)phosphonate, neodymium (2-ethylhexyl) (p-nonylphenyl)phosphonate, and neodymium (p-nonylphenyl) (2-ethyl hexyl) phosphonate.

Suitable neodymium organophosphinates include, but are not limited to, neodymium butylphosphinate, neodymium pentylphosphinate, neodymium hexylphosphinate, neodymium heptylphosphinate, neodymium octylphosphinate, neodymium (1-methylheptyl)phosphinate, neodymium (2-ethylhexyl)phosphinate, neodymium decylphosphinate, neodymium dodecylphosphinate, neodymium octadecylphosphinate, neodymium oleylphosphinate, neodymium phenylphosphinate, neodymium (p-nonylphenyl)phosphinate, neodymium dibutylphosphinate, neodymium dipentylphosphinate, neodymium dihexylphosphinate, neodymium diheptylphosphinate, neodymium dioctylphosphinate, neodymium bis(1-methylheptyl)phosphinate, neodymium bis(2-ethylhexyl)phosphinate, neodymium didecylphosphinate, neodymium didodecylphosphinate, neodymium dioctadecylphosphinate, neodymium dioleylphosphinate, neodymium diphenylphosphinate, neodymium bis(p-nonylphenyl) phosphinate, neodymium butyl (2-ethylhexyl) phosphinate, neodymium (1-methylheptyl)(2-ethylhexyl)phosphinate, and neodymium (2-ethylhexyl)(p-nonylphenyl)phosphinate.

Suitable neodymium carbamates include, but are not limited to, neodymium dimethylcarbamate, neodymium diethylcarbamate, neodymium diisopropylcarbamate, neodymium dibutylcarbamate, and neodymium dibenzylcarbamate.

Suitable neodymium dithiocarbamates include, but are not limited to, neodymium dimethyldithiocarbamate, neodymium diethyldithiocarbamate, neodymium diisopropyldithiocarbamate, neodymium dibutyldithiocarbamate, and neodymium dibenzyldithiocarbamate.

Suitable neodymium xanthates include, but are not limited to, neodymium methylxanthate, neodymium ethylxanthate, neodymium isopropylxanthate, neodymium butylxanthate, and neodymium benzylxanthate.

Suitable neodymium β-diketonates include, but are not limited to, neodymium acetylacetonate, neodymium trifluoroacetylacetonate, neodymium hexafluoroacetylacetonate, neodymium benzoylacetonate, and neodymium 2,2,6,6-tetramethyl-3,5-heptanedionate.

Suitable neodymium alkoxides or aryloxides include, but are not limited to, neodymium methoxide, neodymium ethoxide, neodymium isopropoxide, neodymium 2-ethylhexoxide, neodymium phenoxide, neodymium nonylphenoxide, and neodymium naphthoxide.

Suitable neodymium halides include, but are not limited to, neodymium fluoride, neodymium chloride, neodymium bromide, and neodymium iodide. Suitable neodymium pseudo-halides include, but are not limited to, neodymium cyanide, neodymium cyanate, neodymium thiocyanate, neodymium azide, and neodymium ferrocyanide. Suitable neodymium oxyhalides include, but are not limited to, neodymium oxyfluoride, neodymium oxychloride, and neodymium oxybromide. A Lewis base, such as tetrahydrofuran ("THF"), may be employed as an aid for solubilizing this class of neodymium compounds in inert organic solvents. Where lanthanide halides, lanthanide oxyhalides, or other lanthanide-containing compounds containing a halogen atom are employed, the lanthanide-containing compound may also serve as all or part of the halogen source in the above-mentioned catalyst system.

As used herein, the term "organolanthanide compound" refers to any lanthanide-containing compound containing at least one lanthanide-carbon bond. These compounds are predominantly, though not exclusively, those containing cyclopentadienyl ("Cp"), substituted cyclopentadienyl, allyl, and substituted allyl ligands. Suitable organolanthanide compounds include, but are not limited to, $Cp_3Ln$, $Cp_2LnR$, $Cp_2LnCl$, $CpLnCl_2$, $CpLn$ (cyclooctatetraene), $(C_5Me_5)_2LnR$, $LnR_3$, $Ln(allyl)_3$, and $Ln(allyl)_2Cl$, where Ln represents a lanthanide atom, and R represents a hydrocarbyl group. As used herein, the term "hydrocarbyl" shall denote a monovalent group formed by removing a hydrogen atom from a hydrocarbon. In one or more embodiments, hydrocarbyl groups useful in the present invention may contain heteroatoms such as, for example, nitrogen, oxygen, boron, silicon, sulfur, and phosphorus atoms.

As mentioned above, the catalyst systems of the present invention can include one or more alkylating agents. In one or more embodiments, alkylating agents, which may also be referred to as hydrocarbylating agents, include organometallic compounds that can transfer one or more hydrocarbyl groups to another metal. Typically, these agents include organometallic compounds of electropositive metals such as Groups 1, 2, and 3 metals (Groups IA, IIA, and IIIA metals). Alkylating agents useful in the present invention include, but are not limited to, organoaluminum and organomagnesium compounds. As used herein, the term "organoaluminum compound" refers to any aluminum compound containing at least one aluminum-carbon bond. In one or more embodiments, organoaluminum compounds that are soluble in a hydrocarbon solvent can be employed. As used herein, the term "organomagnesium compound" refers to any magnesium compound that contains at least one magnesium-carbon bond. In one or more embodiments, organomagnesium compounds that are soluble in a hydrocarbon can be employed. As will be described in more detail below, several species of suitable alkylating agents can be in the form of a halide. Where the alkylating agent includes a halogen atom, the alkylating agent may also serve as all or part of the halogen source in the above-mentioned catalyst system.

In one or more embodiments, organoaluminum compounds that can be utilized include those represented by the general formula $AlR_nX_{3-n}$, where each R independently can be a monovalent organic group that is attached to the aluminum atom via a carbon atom, where each X independently can be a hydrogen atom, a halogen atom, a carboxylate group, an alkoxide group, or an aryloxide group, and where n can be an integer in the range of from 1 to 3. In one or more embodiments, each R independently can be a hydrocarbyl group such as, for example, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may contain heteroatoms including, but not limited to, nitrogen, oxygen, boron, silicon, sulfur, and phosphorus atoms.

Types of the organoaluminum compounds that are represented by the general formula $AlR_nX_{3-n}$ include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum halide, hydrocarbylaluminum dihalide, dihydrocarbylaluminum aryloxide, and hydrocarbylaluminum diaryloxide compounds. In one embodiment, the alkylating agent can comprise trihydrocarbylaluminum, dihydrocarbylaluminum hydride, and/or hydrocarbylaluminum dihydride compounds. In one embodiment, when the alkylating agent includes an organoaluminum hydride compound, the above-mentioned halogen source can be provided by a tin halide, as disclosed in U.S. Pat. No. 7,008,899, which is incorporated herein by reference in its entirety.

Suitable trihydrocarbylaluminum compounds include, but are not limited to, trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl)aluminum, triphenylaluminum, tri-p-tolylaluminum, tris(2,6-dimethylphenyl)aluminum, tribenzylaluminum, diethylphenylaluminum, diethyl-p-tolylaluminum, diethylbenzylaluminum, ethyldiphenylaluminum, ethyldi-p-tolylaluminum, and ethyldibenzylaluminum.

Suitable dihydrocarbylaluminum hydride compounds include, but are not limited to, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride.

Suitable hydrocarbylaluminum dihydrides include, but are not limited to, ethylaluminum dihydride, n-propylaluminum dihydride, isopropylaluminum dihydride, n-butylaluminum dihydride, isobutylaluminum dihydride, and n-octylaluminum dihydride.

Suitable dihydrocarbylaluminum halide compounds include, but are not limited to, diethylaluminum chloride, di-n-propylaluminum chloride, diisopropylaluminum chloride, di-n-butylaluminum chloride, diisobutylaluminum chloride, di-n-octylaluminum chloride, diphenylaluminum chloride, di-p-tolylaluminum chloride, dibenzylaluminum chloride, phenylethylaluminum chloride, phenyl-n-propylaluminum chloride, phenylisopropylaluminum chloride, phenyl-n-butylaluminum chloride, phenylisobutylaluminum chloride, phenyl-n-octylaluminum chloride, p-tolylethylaluminum chloride, p-tolyl-n-propylaluminum chloride, p-tolylisopropylaluminum chloride, p-tolyl-n-butylaluminum chloride, p-tolylisobutylaluminum chloride, p-tolyl-n-octylaluminum chloride, benzylethylaluminum chloride, benzyl-n-propylaluminum chloride, benzylisopropylaluminum chloride, benzyl-n-butylaluminum chloride, benzylisobutylaluminum chloride, and benzyl-n-octylaluminum chloride.

Suitable hydrocarbylaluminum dihalide compounds include, but are not limited to, ethylaluminum dichloride, n-propylaluminum dichloride, isopropylaluminum dichloride, n-butylaluminum dichloride, isobutylaluminum dichloride, and n-octylaluminum dichloride.

Other organoaluminum compounds useful as alkylating agents that may be represented by the general formula $AlR_nX_{3-n}$ include, but are not limited to, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis(stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, and isobutylaluminum diphenoxide.

Another class of organoaluminum compounds suitable for use as an alkylating agent in the present invention is aluminoxanes. Aluminoxanes can comprise oligomeric linear aluminoxanes, which can be represented by the general formula:

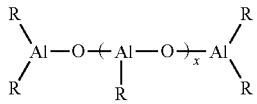

and oligomeric cyclic aluminoxanes, which can be represented by the general formula:

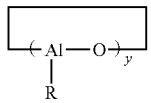

where x can be an integer in the range of from 1 to about 100, or about 10 to about 50; y can be an integer in the range of from 2 to about 100, or about 3 to about 20; and where each R independently can be a monovalent organic group that is attached to the aluminum atom via a carbon atom. In one embodiment, each R independently can be a hydrocarbyl group including, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalyst systems utilizing aluminoxanes.

Aluminoxanes can be prepared by reacting trihydrocarbylaluminum compounds with water. This reaction can be performed according to known methods, such as, for example, (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, or (3) a method in which the trihydrocarbylaluminum compound is reacted with water in the presence of the monomer or monomer solution that is to be polymerized.

Suitable aluminoxane compounds include, but are not limited to, methylaluminoxane ("MAO"), modified methylaluminoxane ("MMAO"), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cyclohexylaluminoxane, 1-methylcyclopentylaluminoxane, phenylaluminoxane, and 2,6-dimethylphenylaluminoxane. Modified methylaluminoxane can be formed by substituting about 20 to 80 percent of the methyl groups of methylaluminoxane with $C_2$ to $C_{12}$ hydrocarbyl groups, preferably with isobutyl groups, by using techniques known to those skilled in the art.

Aiuminoxanes can be used alone or in combination with other organoaluminum compounds. In one embodiment, methylaluminoxane and at least one other organoaluminum compound (e.g., $AlR_nX_{3-n}$), such as diisobutyl aluminum hydride, can be employed in combination. U.S. Publication No. 2008/0182954, which is incorporated herein by reference in its entirety, provides other examples where aluminoxanes and organoaluminum compounds can be employed in combination.

As mentioned above, alkylating agents useful in the present invention can comprise organomagnesium compounds. In one or more embodiments, organomagnesium compounds that can be utilized include those represented by the general formula $MgR_2$, where each R independently can be a monovalent organic group that is attached to the magnesium atom via a carbon atom. In one or more embodiments, each R independently can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, silicon, sulfur, and phosphorus atoms.

Suitable organomagnesium compounds that may be represented by the general formula $MgR_2$ include, but are not limited to, diethylmagnesium, di-n-propylmagnesium, diisopropylmagnesium, dibutylmagnesium, dihexylmagnesium, diphenylmagnesium, and dibenzylmagnesium.

Another class of organomagnesium compounds that can be utilized as an alkylating agent may be represented by the general formula RMgX, where R can be a monovalent organic group that is attached to the magnesium atom via a carbon atom, and X can be a hydrogen atom, a halogen atom, a carboxylate group, an alkoxide group, or an aryloxide group. Where the alkylating agent is an organomagnesium compound that includes a halogen atom, the organomagnesium compound can serve as both the alkylating agent and at least a portion of the halogen source in the catalyst systems of the present invention. In one or more embodiments, R can be a hydrocarbyl group including, but not limited to, alkyl, cycloalkyl, substituted cycloalkyl, alkenyl, cycloalkenyl, substituted cycloalkenyl, aryl, allyl, substituted aryl, aralkyl, alkaryl, and alkynyl groups, with each group containing in the range of from 1 carbon atom, or the appropriate minimum number of carbon atoms to form the group, up to about 20 carbon atoms. These hydrocarbyl groups may also contain heteroatoms including, but not limited to, nitrogen, oxygen, boron, silicon, sulfur, and phosphorus atoms. In one embodiment, X can be a carboxylate group, an alkoxide group, or an aryloxide group, with each group containing in the range of from 1 to about 20 carbon atoms.

Types of organomagnesium compounds that may be represented by the general formula RMgX include, but are not limited to, hydrocarbylmagnesium hydride, hydrocarbylmagnesium halide, hydrocarbylmagnesium carboxylate, hydrocarbylmagnesium alkoxide, and hydrocarbylmagnesium aryloxide.

Suitable organomagnesium compounds that may be represented by the general formula RMgX include, but are not limited to, methylmagnesium hydride, ethylmagnesium hydride, butylmagnesium hydride, hexylmagnesium hydride, phenylmagnesium hydride, benzylmagnesium hydride, methylmagnesium chloride, ethylmagnesium chloride, butylmagnesium chloride, hexylmagnesium chloride, phenylmagnesium chloride, benzylmagnesium chloride, methylmagnesium bromide, ethylmagnesium bromide, butylmagnesium bromide, hexylmagnesium bromide, phenylmagnesium bromide, benzylmagnesium bromide, methylmagnesium hexanoate, ethylmagnesium hexanoate, butylmagnesium hexanoate, hexylmagnesium hexanoate, phenylmagnesium hexanoate, benzylmagnesium hexanoate, methylmagnesium ethoxide, ethylmagnesium ethoxide, butylmagnesium ethoxide, hexylmagnesium ethoxide, phenylmagnesium ethoxide, benzylmagnesium ethoxide, methylmagnesium phenoxide, ethylmagnesium phenoxide, butylmagnesium phenoxide, hexylmagnesium phenoxide, phenylmagnesium phenoxide, and benzylmagnesium phenoxide.

As mentioned above, the catalyst systems of the present invention can include a halogen source. As used herein, the term "halogen source" refers to any substance including at least one halogen atom. In one or more embodiments, at least a portion of the halogen source can be provided by either the above-described lanthanide-containing compound and/or the above-described alkylating agent and/or vinylsilane, allylsilane, or allylvinylsilane, as will be described below, when those compounds contain at least one halogen atom. In other words, the lanthanide-containing compound can serve as both the lanthanide-containing compound and at least a portion of the halogen source. Similarly, the alkylating agent can serve as both the alkylating agent and at least a portion of the halogen source. Similarly, the vinylsilane, allylsilane, or allylvinylsilane can serve as both the respective silane and at least a portion of the halogen source.

In another embodiment, at least a portion of the halogen source can be present in the catalyst systems in the form of a separate and distinct halogen-containing compound. Various compounds, or mixtures thereof, that contain one or more halogen atoms can be employed as the halogen source. Examples of halogen atoms include, but are not limited to, fluorine, chlorine, bromine, and iodine. A combination of two or more halogen atoms can also be utilized. Halogen-containing compounds that are soluble in a hydrocarbon solvent are suitable for use in the present invention. Hydrocarbon-insoluble halogen-containing compounds, however, can be suspended in a polymerization system to form the catalytically active species, and are therefore also useful.

Useful types of halogen-containing compounds that can be employed include, but are not limited to, elemental halogens, mixed halogens, hydrogen halides, organic halides, inorganic halides, metallic halides, and organometallic halides.

Elemental halogens suitable for use in the present invention include, but are not limited to, fluorine, chlorine, bromine, and iodine. Some specific examples of suitable mixed halogens include iodine monochloride, iodine monobromide, iodine trichloride, and iodine pentafluoride.

Hydrogen halides include, but are not limited to, hydrogen fluoride, hydrogen chloride, hydrogen bromide, and hydrogen iodide.

Organic halides include, but are not limited to, t-butyl chloride, t-butyl bromide, allyl chloride, allyl bromide, benzyl chloride, benzyl bromide, chloro-di-phenylmethane, bromo-di-phenylmethane, triphenylmethyl chloride, triphenylmethyl bromide, benzylidene chloride, benzylidene bromide, methyltrichlorosilane, phenyltrichlorosilane, dimethyldichlorosilane, diphenyldichlorosilane, trimethylchlorosilane, benzoyl chloride, benzoyl bromide, propionyl chloride, propionyl bromide, methyl chloroformate, and methyl bromoformate.

Inorganic halides include, but are not limited to, phosphorus trichloride, phosphorus tribromide, phosphorus pentachloride, phosphorus oxychloride, phosphorus oxybromide, boron trifluoride, boron trichloride, boron tribromide, silicon tetrafluoride, silicon tetrachloride, silicon tetrabromide, silicon tetraiodide, arsenic trichloride, arsenic tribromide, arsenic triiodide, selenium tetrachloride, selenium tetrabromide, tellurium tetrachloride, tellurium tetrabromide, and tellurium tetraiodide.

Metallic halides include, but are not limited to, tin tetrachloride, tin tetrabromide, aluminum trichloride, aluminum tribromide, antimony trichloride, antimony pentachloride, antimony tribromide, aluminum triiodide, aluminum trifluoride, gallium trichloride, gallium tribromide, gallium triiodide, gallium trifluoride, indium trichloride, indium tribromide, indium triiodide, indium trifluoride, titanium tetrachloride, titanium tetrabromide, titanium tetraiodide, zinc dichloride, zinc dibromide, zinc diiodide, and zinc difluoride.

Organometallic halides include, but are not limited to, dimethylaluminum chloride, diethylaluminum chloride, dimethylaluminum bromide, diethylaluminum bromide, dimethylaluminum fluoride, diethylaluminum fluoride, methylaluminum dichloride, ethylaluminum dichloride, methylaluminum dibromide, ethylaluminum dibromide, methylaluminum difluoride, ethylaluminum difluoride, methylaluminum sesquichloride, ethylaluminum sesquichloride, isobutylaluminum sesquichloride, methylmagnesium chloride, methylmagnesium bromide, methylmagnesium iodide, ethylmagnesium chloride, ethylmagnesium bromide, butylmagnesium chloride, butylmagnesium bromide, phenylmagnesium chloride, phenylmagnesium bromide, benzylmagnesium chloride, trimethyltin chloride, trimethyltin bromide, triethyltin chloride, triethyltin bromide, di-t-butyltin dichloride, di-t-butyltin dibromide, dibutyltin dichloride, dibutyltin dibromide, tributyltin chloride, and tributyltin bromide.

In one or more embodiments, the above-described catalyst systems can comprise a compound containing a non-coordinating anion or a non-coordinating anion precursor. In one or more embodiments, a compound containing a non-coordinating anion, or a non-coordinating anion precursor can be employed in lieu of the above-described halogen source. A non-coordinating anion is a sterically bulky anion that does not form coordinate bonds with, for example, the active center of a catalyst system due to steric hindrance. Non-coordinating anions useful in the present invention include, but are not limited to, tetraarylborate anions and fluorinated tetraarylborate anions. Compounds containing a non-coordinating anion can also contain a counter cation, such as a carbonium, ammonium, or phosphonium cation. Exemplary counter cations include, but are not limited to, triarylcarbonium cations and N,N-dialkylanilinium cations. Examples of compounds containing a non-coordinating anion and a counter cation include, but are not limited to, triphenylcarbonium tetrakis(pentafluorophenyl)borate, N,N-dimethylanilinium tetrakis(pentafluorophenyl)borate, triphenylcarbonium tetrakis[3,5-bis(trifluoromethyl)phenyl]borate, and N,N-dimethylanilinium tetrakis[3,5-bis(trifluoromethyl) phenyl]borate.

A non-coordinating anion precursor can also be used in this embodiment. A non-coordinating anion precursor is a compound that is able to form a non-coordinating anion under reaction conditions. Useful non-coordinating anion precursors include, but are not limited to, triarylboron compounds, $BR_3$, where R is a strong electron-withdrawing aryl group, such as a pentafluorophenyl or 3,5-bis(trifluoromethyl)phenyl group.

As mentioned above, the catalyst systems of the present invention can include a vinylsilane, an allylsilane, or an allylvinylsilane. For purposes of this specification, these compounds may simply be referred to as silane compounds. Vinylsilanes include any silane compound containing at least one vinyl group bonded to a silicon atom; allylsilanes include any silane compound containing at least one allyl group bonded to a silicon atom; and allylvinylsilanes include any silane compound containing at least one allyl group bonded to a silicon atom and at least one vinyl group bonded to a silicon atom. For purposes of this specification, the terms vinylsilane, allylsilane, and allylvinylsilane also include those silane compounds where the vinyl or allyl groups are substituted, which refers to the replacement of a hydrogen atom in the parent vinyl group (i.e., $-CH=CH_2$) or parent allyl group (i.e., $-CH_2CH=CH_2$) with a substituent such as a monovalent organic group or a halogen atom. In one or more embodiments, the silane compounds may be monomeric, dimeric, trimeric, tetrameric, oligomeric, or polymeric. In these or other embodiments, the silane compounds may have a cyclic or acyclic structure. A combination of two or more silanes may be employed. As will be described in more detail below, several species of suitable silane compounds can include a halogen atom, and therefore where the silane compound includes a halogen atom, the silane compound may also serve as all or part of the halogen source in the above-mentioned catalyst system.

In one or more embodiments, the silane compounds may be defined by the formula $Si\omega_x\theta_{4-x}$, where each $\omega$ is independently a vinyl group, a substituted vinyl group, an allyl group, or a substituted allyl group, each $\theta$ is independently a hydrogen atom, a halogen atom, or a monovalent organic group, or two or more $\theta$ groups may join to form a polyvalent organic group, and x is an integer from 1 to 4. For purposes of this specification, polyvalent organic group refers to an organic group that has a valence of two or more, such as a divalent, trivalent or tetravalent organic group. In one or more embodiments, the silane compound formed when two or more $\theta$ groups join together may be monocyclic, bicyclic, tricyclic, or polycyclic.

In one or more embodiments, vinylsilanes may be defined by the formula $Si(C\theta=C\theta_2)_x\theta_{4-x}$, where each $\theta$ is independently a hydrogen atom, a halogen atom, or a monovalent organic, or two or more $\theta$ groups may join to form a polyvalent organic group, and x is an integer from 1 to 4. In particular embodiments, vinylsilanes may be defined by the formula $Si(CH=CH_2)_x\theta_{4-x}$, where each $\theta$ is independently a hydrogen atom, a halogen atom, or a monovalent organic, or two or more $\theta$ groups may join to form a polyvalent organic group, and x is an integer from 1 to 4.

In other embodiments, allylsilanes may be defined by the formula $Si(C\theta_2C\theta=C\theta_2)_x\theta_{4-x}$, where each $\theta$ is independently a hydrogen atom, a halogen atom, a monovalent organic, or two or more $\theta$ groups may join to form a polyvalent organic group, and x is an integer from 1 to 4. In particular embodiments, allylsilanes may be defined by the formula $Si(CH_2CH=CH_2)_x\theta_{4-x}$, where each $\theta$ is independently a hydrogen atom, a halogen atom, a monovalent organic, or two or more $\theta$ groups may join to form a polyvalent organic group, and x is an integer from 1 to 4.

In these or other embodiments, allylvinylsilanes may be defined by the formula $Si(C\theta_2C\theta=C\theta_2)_x(C\theta=C\theta_2)_y\theta_z$, where each $\theta$ is independently a hydrogen atom, a halogen atom, or a monovalent organic, or two or more $\theta$ groups may join to form a polyvalent organic group, x is an integer from 1 to 3, y is an integer from 1 to 3, z is an integer from 0 to 2, and the sum of x, y, and z is 4. In particular embodiments, allylvinylsilanes may be defined by the formula $Si(CH_2CH=CH_2)_x(CH=CH_2)_y\theta_z$, where each $\theta$ is independently a hydrogen atom, a halogen atom, or a monovalent organic, or two or more $\theta$ groups may join to form a polyvalent organic group, x is an integer from 1 to 3, y is an integer from 1 to 3, z is an integer from 0 to 2, and the sum of x, y, and z is 4.

In one or more embodiments, the monovalent organic groups of the silane compounds may be hydrocarbyl groups or substituted hydrocarbyl groups such as, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the silane compounds may be hydrocarbyloxy groups or substituted hydrocarbyloxy groups such as, but not limited to, alkyloxy, cycloalkyloxy, alkenyloxy, cycloalkenyloxy, aryloxy, allyloxy, aralkyloxy, alkaryloxy, or alkynyloxy groups. Substituted hydrocarbyloxy groups include hydrocarbyloxy groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the silane compounds may be carboxylate groups or substituted carboxylate groups such as, but not limited to, alkanecarboxylate, cycloalkanecarboxylate, alkenecarboxylate, cycloalkenecarboxylate, arenecarboxylate, alkynecarboxylate, and cycloalkynecarboxylate groups. Substituted carboxylate groups include carboxylate groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the silane compounds may be silyl groups or substituted silyl groups such as, but not limited to, trihydrocarbylsilyl, trisilyloxysilyl, trihydrocarbyloxysilyl, trisilylsilyl, dihydrocarbylhydrosilyl, dihydrocarbyl(silyloxy)silyl, dihydrocarbyl(silyl)silyl, dihydrocarbyl(hydrocarbyloxy)silyl, hydrocarbyldihydrosilyl, hydrocarbyl(disilyloxy)silyl, hydrocarbyl(disilyl)silyl, and hydrocarbyl(dihydrocarbyloxy)silyl groups. For example, types of silyl groups may include trialkylsilyl, dialkylhydrosilyl, dialkyl(silyloxy)silyl, dialkyl(silyl)silyl, tricycloalkylsilyl, dicycloalkylhydrosilyl, dicycloalkyl(silyloxy)silyl, dicycloalkyl(silyl)silyl, trialkenylsilyl, dialkenylhydrosilyl, dialkenyl(silyloxy)silyl, dialkenyl(silyl)silyl, tricycloalkenylsilyl, dicycloalkenylhydrosilyl, dicycloalkenyl(silyloxy)silyl, dicycloalkenyl(silyl)silyl, triarylsilyl, diarylhydrosilyl, diaryl(silyloxy)silyl, diaryl(silyl)silyl, triallylsilyl, diallylhydrosilyl, diallyl(silyloxy)silyl, diallyl(silyl)silyl, triaralkylsilyl, diaralkylhydrosilyl, diaralkyl(silyloxy)silyl, diaralkyl(silyl)silyl, trialkarylsilyl, dialkarylhydrosilyl, dialkaryl(silyloxy)silyl, dialkaryl(silyl)silyl, trialkynylsilyl, dialkynylhydrosilyl, dialkynyl(silyloxy)silyl, dialkynyl(silyl)silyl, tris(trialkylsilyloxy)silyl, tris(triarylsilyloxy)silyl, tris(tricycloalkylsilyloxy)silyl, tris(trialkoxysilyloxy)silyl, tris(triaryloxysilyloxy)silyl, or tris(tricycloalkyloxysilyloxy)silyl groups. Substituted silyl groups include silyl groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the silane compounds may be silyloxy groups or substituted silyloxy groups such as, but not limited to, trihydrocarbylsilyloxy, trihydrocarbyloxysilyloxy, trisilyloxysilyloxy, trisilylsilyloxy, dihydrocarbylhydrosilyloxy, dihydrocarbyl(silyloxy)silyloxy, dihydrocarbyl(silyl)silyloxy, dihydrocarbyl(hydrocarbyloxy)silyloxy, hydrocarbyldihydrosilyloxy, hydrocarbyl(disilyloxy)silyloxy, hydrocarbyl(disilyl)silyloxy, and hydrocarbyl(dihydrocarbyloxy)silyloxy groups. For example, types of silyloxy groups may include trialkylsilyloxy, dialkylhydrosilyloxy, dialkyl(silyloxy)silyloxy, dialkyl(silyl)silyloxy, tricycloalkylsilyloxy, dicycloalkylhydrosilyloxy, dicycloalkyl(silyloxy)silyloxy, dicycloalkyl(silyl)silyloxy, trialkenylsilyloxy, dialkenylhydrosilyloxy, dialkenyl(silyloxy)silyloxy, dialkenyl(silyl)silyloxy, tricycloalkenylsilyloxy, dicycloalkenylhydrosilyloxy, dicycloalkenyl(silyloxy)silyloxy, dicycloalkenyl(silyl)silyloxy, triarylsilyloxy, diarylhydrosilyloxy, diaryl(silyloxy)silyloxy, diaryl(silyl)silyloxy, diallylhydrosilyloxy, diallyl(silyloxy)silyloxy, diallyl(silyl)silyloxy, triaralkylsilyloxy, diaralkylhydrosilyloxy, diaralkyl(silyloxy)silyloxy, diaralkyl(silyl)silyloxy, trialkarylsilyloxy, dialkarylhydrosilyloxy, dialkaryl(silyloxy)silyloxy, dialkaryl(silyl)silyloxy, trialkynylsilyloxy, dialkynylhydrosilyloxy, dialkynyl(silyloxy)silyloxy, dialkynyl(silyl)silyloxy, tris(trialkylsilyloxy)silyloxy, tris(triarylsilyloxy)silyloxy, tris(tricycloalkylsilyloxy)silyloxy, tris(trialkoxysilyloxy)silyloxy, tris(triaryloxysilyloxy)silyloxy, or tris(tricycloalkyloxysilyloxy)silyloxy groups. Substituted silyloxy groups include silyloxy groups in which one or more hydrogen atoms have been replaced by a substituent such as a hydrocarbyl, hydrocarbyloxy, silyl, or siloxy group. In one or more embodiments, these groups may include from one, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

In one or more embodiments, the monovalent organic groups of the silane compounds may be protected amino groups, which include those amino groups that are formed or derived by replacing the two hydrogen atoms of the parent amino group (i.e. —$NH_2$) with other substituents such as hydrocarbyl or silyl groups. Exemplary types of protected amino groups include, but are not limited to, bis(trihydrocarbylsilyl)amino, bis(dihydrocarbylhydrosilyl)amino, 1-aza-disila-1-cyclohydrocarbyl, (trihydrocarbylsilyl)(hydrocarbyl)amino, (dihydrocarbylhydrosilyl)(hydrocarbyl)amino, 1-aza-2-sila-1-cyclohydrocarbyl, dihydrocarbylamino, and 1-aza-1-cyclohydrocarbyl groups.

Representative examples of suitable vinylsilanes include, but are not limited to, vinyldimethylsilane, vinyltrimethylsilane, vinyltriethylsilane, vinyltriphenylsilane, vinyl-t-butyldimethylsilane, vinyl-di-n-octylmethylsilane, vinylphenylmethylsilane, vinylphenyldimethylsilane, vinyl(trifluoromethyl)dimethylsilane, divinyldimethylsilane, trivinylsilane, trivinylmethylsilane, tetravinylsilane, tris(vinyldimethylsiloxy)methylsilane, tris(vinyldimethylsiloxy)phenylsilane, vinyldimethylfluorosilane, vinyldimethylchlorosilane, vinyldiphenylchlorosilane, vinylphenylmethylchlorosilane, vinylmethyldichlorosilane, vinylphenyldichlorosilane, vinyltrichlorosilane, divinyldichlorosilane, trivinylchlorosilane, vinyl(chloromethyl)dimethylsilane, vinyl(bromomethyl)dimethylsilane, vinyldimethylmethoxysilane, vinylphenylmethylmethoxysilane, vinyldimethylethoxysilane, vinyldiphenylethoxysilane, vinylmethyldimethoxysilane, vinylmethyldiethoxysilane, vinylphenyldiethoxysilane, vinyltrimethoxysilane, vinyltriethoxysilane, vinyltriisopropoxysilane, vinyltri-t-butoxysilane, vinyltriisopropenoxysilane, vinyltriphenoxysilane, vinyltris(2-methoxyethoxy)silane, vinyltris(methoxypropoxy)silane, trivinylmethoxysilane, trivinylethoxysilane, vinylsilatrane, vinylmethylbis(trimethylsiloxy)silane, vinyltris(dimethylsiloxy)silane, vinyltris(trimethylsiloxy)silane, tetrakis(vinyldimethylsiloxy)silane, vinylmethyldiacetoxysilane, vinyltriacetoxysilane, vinylmethylbis(dimethylamino)silane, 1-propenylmethyldichlorosilane, 2-propenyltrimethylsilane, 1-bromovinyltrimethylsilane, 2-bromovinyltrimethylsilane, (1-methoxyvinyl)trimethylsilane, vinylmethylsilacyclopentane, vinyltetramethyldisiloxane, vinylpentamethyldisiloxane, 1,3-divinyltetramethyldisiloxane, 1,3-divinyl-1,3-diphenyl-1,3-dimethyldisiloxane, 1,3-divinyltetraphenyldisiloxane, 1,1,3,3-tetravinyldimethyldisiloxane, 1,3-divinyltetraethoxydisiloxane, 1,3-divinyltetrakis(trimethylsiloxy)disiloxane, 1-vinyl-3-(chloromethyl)-1,1,3,3-tetramethyldisiloxane, 1,3-divinyl-1,3-dimethyl-1,3-dichlorodisiloxane, 1,2-divinyltetramethyldisilane, 1,4-divinyltetramethyldisilylethane, 1,4-bis(vinyldimethylsilyl)benzene, tris(vinyldimethylsilyl)borate, 1,5-divinylhexamethyltrisiloxane, 1,5-divinyl-3-phenylpentamethyltrisiloxane, 1,5-divinyl-3,3-diphenyl-1,1,5,5-tetramethyltrisiloxane, 1,3,5-trivinyl-1,1,3,5,5-pentamethyltrisiloxane, 1,3,5-trivinyl-1,3,5-trimethylcyclotrisiloxane, 1,3,5,7-tetravinyl-1,3,5,7-tetramethylcyclotetrasiloxane, and octavinyl-T8-silsesquioxane.

Representative examples of suitable allylsilanes include, but are not limited to, allyldimethylsilane, allyltrimethylsilane, allyltriisopropylsilane, allyltriphenylsilane, diallyldimethylsilane, diallyldiphenylsilane, triallylmethylsilane, tetraallylsilane, ally(chloromethyl)dimethylsilane, allyldimethylchlorosilane, allyldichlorosilane, allylmethyldichlorosilane, allylphenyldichlorosilane, allyl(chloropropyl)dichlorosilane, allyltrichlorosilane, (2-chloromethylallyl)trichlorosilane, allyldimethoxysilane, allyltrimethoxysilane, allyltriethoxysilane, allyltriphenoxysilane, allyltris(trimethylsiloxy)silane, (2-chloromethylallyl)trimethoxysilane, allyldimethyl(diisopropylamino)silane, 1,1-bis(trimethylsilylmethyl)ethylene, 1,1-bis(trichlorosilylmethyl)ethylene, 1,1-bis(trimethoxysilylmethyl)ethylene, methallyltrimethylsilane, 1-allyl-1,1,3,3-tetramethyldisiloxane, 1,3-diallyltetramethyldisiloxane, and 1,3-diallyltetrakis(trimethylsiloxy)disiloxane.

Representative examples of suitable allylvinylsilanes include, but are not limited to, allylvinylmethylsilane, allylvinylphenylsilane, allylvinyldimethylsilane, allylvinyldiphenylsilane, allyltrivinylsilane, diallyldivinylsilane, triallylvinylsilane, allylvinylchlorosilane, allylvinyldichlorosilane, allylvinyldifluorosilane, allylvinyldimethoxysilane, allylvinyldiethoxysilane, allylvinyldiphenoxysilane, allylvinylbis(trimethylsiloxy)silane, allylvinyldiacetoxysilane, and allylvinylbis(dimethylamino)silane.

The catalyst composition of this invention may be formed by combining or mixing the foregoing catalyst ingredients. Although one or more active catalyst species are believed to result from the combination of the catalyst ingredients, the degree of interaction or reaction between the various catalyst ingredients or components is not known with any great degree of certainty. The combination or reaction product of the lanthanide compound, alkylating agent, halogen source, and silane compound may be referred to as a catalyst system or catalyst composition. The silane compound, as used herein, may be referred to as a component of that system or as a modifier to that system. In this respect, reference to catalyst ingredients refers to the lanthanide compound, the alkylating agent, the halogen source, and the silane compound. The term modified catalyst composition or modified catalyst system may be employed to encompass a simple mixture of the ingredients, a complex of the various ingredients that is caused by physical or chemical forces of attraction, a chemical reaction product of the ingredients, or a combination of the foregoing.

The catalyst composition of this invention advantageously has a technologically useful catalytic activity for polymerizing conjugated dienes into polydienes over a wide range of catalyst concentrations and catalyst ingredient ratios. Several factors may impact the optimum concentration of any one of the catalyst ingredients. For example, because the catalyst ingredients may interact to form an active species, the optimum concentration for any one catalyst ingredient may be dependent upon the concentrations of the other catalyst ingredients.

In one or more embodiments, the molar ratio of the alkylating agent to the lanthanide compound (alkylating agent/Ln) can be varied from about 1:1 to about 1,000:1, in other embodiments from about 2:1 to about 500:1, and in other embodiments from about 5:1 to about 200:1.

In those embodiments where both an aluminoxane and at least one other organoaluminum agent are employed as alkylating agents, the molar ratio of the aluminoxane to the lanthanide compound (aluminoxane/Ln) can be varied from 5:1 to about 1,000:1, in other embodiments from about 10:1 to about 700:1, and in other embodiments from about 20:1 to about 500:1; and the molar ratio of the at least one other organoaluminum compound to the lanthanide compound (Al/Ln) can be varied from about 1:1 to about 200:1, in other embodiments from about 2:1 to about 150:1, and in other embodiments from about 5:1 to about 100:1.

The molar ratio of the halogen source to the lanthanide compound is best described in terms of the ratio of the moles of halogen atoms in the halogen source to the moles of lanthanide atoms in the lanthanide compound (halogen/Ln). In one or more embodiments, the halogen/Ln molar ratio can be varied from about 0.5:1 to about 20:1, in other embodiments from about 1:1 to about 10:1, and in other embodiments from about 2:1 to about 6:1.

In relevant embodiments, the molar ratio of the non-coordinating anion or non-coordinating anion precursor to the lanthanide compound (An/Ln) may be from about 0.5:1 to about 20:1, in other embodiments from about 0.75:1 to about 10:1, and in other embodiments from about 1:1 to about 6:1.

In one or more embodiments, the molar ratio of the silane compound to the lanthanide compound (silane/Ln) can be varied from 0.5:1 to about 1,000:1, in other embodiments from about 1:1 to about 700:1, and in other embodiments from about 5:1 to about 500:1.

The catalyst systems of this invention can be formed by employing several techniques. For example, the catalyst systems may be formed by adding the catalyst components directly to the monomer to be polymerized. In this respect, the catalyst components including the silane compound may be added either in a stepwise or simultaneous manner. In one embodiment, when the catalyst ingredients are added in a stepwise manner, the silane compound can be added first, followed by the alkylating agent, followed by the lanthanide compound, and ultimately followed by the halogen source. The addition of the catalyst components directly and individually to the monomer to be polymerized may be referred to as an in situ formation of the catalyst system.

In other embodiments, the catalyst may be preformed. That is, the catalyst ingredients including the silane compound may be introduced and pre-mixed outside of the monomer to be polymerized. In particular embodiments, the preformation of the catalyst may occur either in the absence of any monomer or in the presence of a small amount of at least one conjugated diene monomer at an appropriate temperature, which is generally from about −20° C. to about 80° C. Mixtures of conjugated diene monomers may also be used. The amount of conjugated diene monomer that may be used for preforming the catalyst can range from about 1 to about 500 moles, in other embodiments from about 5 to about 250 moles, and in other embodiments from about 10 to about 100 moles per mole of the lanthanide compound. The resulting preformed catalyst composition can be aged, if desired, prior to being added to the monomer that is to be polymerized.

In other embodiments, the catalyst may be formed by using a two-stage procedure. The first stage can involve combining the lanthanide compound with the alkylating agent either in the absence of any monomer or in the presence of a small amount of at least one conjugated diene monomer at an appropriate temperature (e.g., −20° C. to about 80° C.). The amount of monomer employed in preparing this first-stage mixture may be similar to that set forth above for preforming the catalyst. In the second stage, the mixture prepared in the first stage, the silane compound, and the halogen source can be added in either a stepwise or simultaneous manner to the monomer that is to be polymerized. In one embodiment, the silane compound can be added first, followed by the mixture prepared in the first stage, and then followed by the halogen source.

In one or more embodiments, a solvent may be employed as a carrier to either dissolve or suspend the catalyst or catalyst ingredients in order to facilitate the delivery of the catalyst or catalyst ingredients to the polymerization system. In other embodiments, conjugated diene monomer can be used as the catalyst carrier. In yet other embodiments, the catalyst ingredients can be used in their neat state without any solvent.

In one or more embodiments, suitable solvents include those organic compounds that will not undergo polymerization or incorporation into propagating polymer chains during the polymerization of monomer in the presence of catalyst. In one or more embodiments, these organic species are liquid at ambient temperature and pressure. In one or more embodiments, these organic solvents are inert to the catalyst. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, such as paraffinic oil, aromatic oil, or other hydrocarbon oils that are commonly used to oil-extend polymers. Since these hydrocarbons are non-volatile, they typically do not require separation and remain incorporated in the polymer.

The production of polydienes according to this invention can be accomplished by polymerizing conjugated diene monomer in the presence of a catalytically effective amount of the foregoing catalyst composition. The introduction of the catalyst composition, the conjugated diene monomer, and any solvent if employed forms a polymerization mixture in which the polymer product is formed. The total catalyst concentration to be employed in the polymerization mixture may depend on the interplay of various factors such as the purity of the ingredients, the polymerization temperature, the polymerization rate and conversion desired, the molecular weight desired, and many other factors. Accordingly, a specific total catalyst concentration cannot be definitively set forth except to say that catalytically effective amounts of the respective catalyst ingredients can be used. In one or more embodiments, the amount of the lanthanide compound used can be varied from about 0.01 to about 2 mmol, in other embodiments from about 0.02 to about 1 mmol, and in other embodiments from about 0.05 to about 0.5 mmol per 100 g of conjugated diene monomer.

In one or more embodiments, the polymerization of conjugated diene monomer according to this invention may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst is usually added to the polymerization system. The additional solvent may be the same as or different from the solvent used in preparing the catalyst. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

In other embodiments, the polymerization system employed may be generally considered a bulk polymerization system that includes substantially no solvent or a minimal amount of solvent. Those skilled in the art will appreciate the benefits of bulk polymerization processes (i.e., processes where monomer acts as the solvent), and therefore the polymerization system includes less solvent than will deleteriously impact the benefits sought by conducting bulk polymerization. In one or more embodiments, the solvent content of the polymerization mixture may be less than about 20% by weight, in other embodiments less than about 10% by weight, and in still other embodiments less than about 5% by weight based on the total weight of the polymerization mixture. In still another embodiment, the polymerization mixture is substantially devoid of solvent, which refers to the absence of that amount of solvent that would otherwise have an appreciable impact on the polymerization process. Polymerization systems that are substantially devoid of solvent may be referred to as including substantially no solvent. In particular embodiments, the polymerization mixture is devoid of solvent.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

The polydienes produced by the polymerization process of this invention may possess pseudo-living characteristics, such that some of polymer chains in these polymers have reactive chain ends. Once a desired monomer conversion is achieved, a functionalizing agent may optionally be introduced into the polymerization mixture to react with any reactive polymer chains so as to give a functionalized polymer. In one or more embodiments, the functionalizing agent is introduced prior to contacting the polymerization mixture with a quenching agent. In other embodiments, the functionalizing may be introduced after the polymerization mixture has been partially quenched with a quenching agent.

In one or more embodiments, functionalizing agents include compounds or reagents that can react with a reactive polymer produced by this invention and thereby provide the polymer with a functional group that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful functionalizing agents may include compounds that simply provide a functional group at the end of a polymer chain without joining two or more polymer chains together, as well as compounds that can couple or join two or more polymer chains together via a functional linkage to form a single macromolecule. The latter type of functionalizing agents may also be referred to as coupling agents.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with pseudo-living polymers (e.g., those produced in accordance with this invention). Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Pat. Publ. Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of functionalizing agents include azine compounds as described in U.S. Pat. Publ. No. 2007/0149717, hydrobenzamide compounds as disclosed in U.S. Pat. Publ. No. 2007/0276122, nitro compounds as disclosed in U.S. Pat. Publ. No. 2008/0051552, and protected oxime compounds as disclosed in U.S. Pat. Publ. No. 2008/0146745, all of which are incorporated herein by reference.

In particular embodiments, the functionalizing agents employed may be coupling agents which include, but are not limited to, metal halides such as tin tetrachloride, metalloid halides such as silicon tetrachloride, metal ester-carboxylate complexes such as dioctyltin bis(octylmaleate), alkoxysilanes such as tetraethyl orthosilicate, and alkoxystannanes such as tetraethoxytin. Coupling agents can be employed either alone or in combination with other functionalizing agents. The combination of functionalizing agents may be used in any molar ratio.

The amount of functionalizing agent introduced to the polymerization mixture may depend upon various factors including the type and amount of catalyst used to initiate the polymerization, the type of functionalizing agent, the desired level of functionality and many other factors. In one or more embodiments, the amount of functionalizing agent may be in a range of from about 1 to about 200 moles, in other embodiments from about 5 to about 150 moles, and in other embodiments from about 10 to about 100 moles per mole of the lanthanide compound.

Because reactive polymer chains may slowly self-terminate at high temperatures, in one embodiment the functionalizing agent may be added to the polymerization mixture once a peak polymerization temperature is observed. In other embodiments, the functionalizing agent may be added within about 25 to 35 minutes after the peak polymerization temperature is reached.

In one or more embodiments, the functionalizing agent may be introduced to the polymerization mixture after a desired monomer conversion is achieved but before a quenching agent containing a protic hydrogen atom is added. In one or more embodiments, the functionalizing agent is added to the polymerization mixture after a monomer conversion of at least 5%, in other embodiments at least 10%, in other embodiments at least 20%, in other embodiments at least 50%, and in other embodiments at least 80%. In these or other embodiments, the functionalizing agent is added to the polymerization mixture prior to a monomer conversion of 90%, in other embodiments prior to 70% monomer conversion, in other embodiments prior to 50% monomer conversion, in other embodiments prior to 20% monomer conversion, and in other embodiments prior to 15%. In one or more embodiments, the functionalizing agent is added after complete, or substantially complete monomer conversion. In particular embodiments, a functionalizing agent may be introduced to the polymerization mixture immediately prior to, together with, or after the introduction of a Lewis base as disclosed in U.S. Pat. Publ. No. 2009/0043046, which is incorporated herein by reference.

In one or more embodiments, the functionalizing agent may be introduced to the polymerization mixture at a location (e.g., within a vessel) where the polymerization (or at least a portion thereof) has been conducted. In other embodiments, the functionalizing agent may be introduced to the polymerization mixture at a location that is distinct from where the polymerization (or at least a portion thereof) has taken place. For example, the functionalizing agent may be introduced to the polymerization mixture in downstream vessels including downstream reactors or tanks, in-line reactors or mixers, extruders, or devolatilizers.

Once a functionalizing agent has been introduced to the polymerization mixture and a desired reaction time has been provided, a quenching agent can be added to the polymerization mixture in order to inactivate any residual reactive polymer chains and the catalyst or catalyst components. The quenching agent may be a protic compound, which includes, but is not limited to, an alcohol, a carboxylic acid, an inorganic acid, water, or a mixture thereof. In particular embodiments, the quenching agent includes a polyhydroxy compound as disclosed in U.S. Pat. Publ. No. 2009/0043055, which is incorporated herein by reference. An antioxidant such as 2,6-di-t-butyl-4-methylphenol may be added along with, before, or after the addition of the quenching agent. The amount of the antioxidant employed may be in the range of about 0.2% to about 1% by weight of the polymer product. The quenching agent and the antioxidant may be added as neat materials or, if necessary, dissolved in a hydrocarbon solvent or conjugated diene monomer prior to being added to the polymerization mixture Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170° C.) and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Where cis-1,4-polydienes (e.g., cis-1,4-polybutadiene) are produced by one or more embodiments of the process of this invention, the cis-1,4-polydienes may advantageously have a cis-1,4 linkage content in excess of 96%, in other embodiments in excess of 97%, in other embodiments in excess of 98%, and in other embodiments in excess of 99%. Advantageously, these polymers exhibit excellent viscoelastic properties and are particularly useful in the manufacture of various tire components including, but not limited to, tire treads, sidewalls, subtreads, and bead fillers. The cis-1,4-polydienes can be used as all or part of the elastomeric component of a tire stock. When the cis-1,4-polydienes are used in conjunction with other rubbers to form the elastomeric component of a tire stock, these other rubbers may be natural rubber, synthetic rubbers, and mixtures thereof. Examples of synthetic rubber include polyisoprene, poly(styrene-co-butadiene), polybutadiene with low cis-1,4-linkage content, poly(styrene-co-butadiene-co-isoprene), and mixtures thereof. The cis-1,4-polydienes can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

In the following examples, the Mooney viscosities ($ML_{1+4}$) of the polymer samples were determined at 100° C. by using a Alpha Technologies Mooney viscometer with a large rotor, a one-minute warm-up time, and a four minute running time. The number-average molecular weights ($M_n$), weight-average molecular weights ($M_w$), and molecular weight distributions ($M_w/M_n$) of the polymer samples were determined by gel permeation chromatography (GPC) calibrated with polystyrene standards and Mark-Houwink constants for the polymers in question. The cis-1,4-linkage, trans-1,4-linkage, and 1,2-linkage contents of the polymer samples were determined by Infrared spectroscopy.

Examples 1-7

Control Examples

In Examples 1-7, the polymerization of 1,3-butadiene was conducted in the absence of a silane compound.

A preformed catalyst was prepared by mixing 7.50 ml of 4.32 M methylaluminoxane in toluene, 2.41 ml of 22.0 wt % 1,3-butadiene in hexane, 0.60 ml of 0.537 M neodymium versatate in cyclohexane, 6.80 ml of 1.0 M diisobutylaluminum hydride in hexane, and 1.30 ml of 1.0 M diethylaluminum chloride in hexane. The catalyst was aged at room temperature for 15 minutes and then diluted with 24.6 ml of toluene. The resulting catalyst had a concentration of 0.0075 M in neodymium metal and was used below for polymerization.

In Example 1, an oven-dried 800-mL glass bottle was capped with a self-sealing rubber liner and a perforated metal cap. After the bottle was thoroughly purged with a stream of dry nitrogen, it was charged with 106 g of hexanes and 227 g of a 1,3-butadiene/hexanes blend containing 22.0% by weight of 1,3-butadiene, followed by the addition of 4.00 ml of the preformed catalyst solution as prepared above. The bottle was tumbled for 45 minutes in a water bath maintained at 65° C. The polymerization was terminated by addition of 3 mL of isopropanol containing 0.30 g of 2,6-di-tert-butyl-4-methylphenol. The resulting polymer cement was coagulated with 3 liters of isopropanol containing 0.5 g of 2,6-di-tert-butyl-4-methylphenol, and then drum-dried. The yield of the polymer was 47.8 g (95.6%).

In Examples 2-7, the polymerization procedure described above in Example 1 was repeated except that the amount of the preformed catalyst and the polymerization time were varied.

The polymerization conditions and the properties of the resulting polymer in Examples 1-7 are summarized in Table I.

TABLE 1

| Example | 1 | 2 | 3 | 4 | 5 | 6 | 7 |
|---|---|---|---|---|---|---|---|
| Hexane (g) | 106 | 106 | 106 | 106 | 106 | 106 | 106 |
| 22.0% 1,3-Bd/Hexane (g) | 227 | 227 | 227 | 227 | 227 | 227 | 227 |
| Catalyst amount (mmol of Nd) | 0.0300 | 0.0275 | 0.025 | 0.0225 | 0.020 | 0.0175 | 0.015 |
| Polymerization time (min.) | 45 | 50 | 55 | 60 | 65 | 73 | 80 |
| Polymer yield (%) | 95.6 | 96.1 | 95.4 | 96.2 | 96.2 | 96.4 | 96.8 |
| $ML_{1+4}$ | 22.0 | 25.4 | 30.1 | 37.0 | 44.4 | 53.7 | 64.5 |
| $M_n$ | 104,400 | 110,900 | 120,400 | 128,900 | 140,800 | 150,800 | 162,700 |
| $M_w$ | 203,900 | 215,900 | 231,800 | 245,200 | 264,700 | 287,300 | 305,300 |
| $M_w/M_n$ | 1.95 | 1.95 | 1.93 | 1.90 | 1.88 | 1.91 | 1.88 |
| cis-1,4-linkage (%) | 93.87 | 94.08 | 94.47 | 94.78 | 95.13 | 95.51 | 95.98 |
| trans-1,4-linkage (%) | 5.48 | 5.27 | 4.91 | 4.60 | 4.27 | 3.89 | 3.43 |
| 1,2-linkage (%) | 0.65 | 0.65 | 0.62 | 0.62 | 0.60 | 0.60 | 0.59 |

In FIG. 1, the cis-1,4-linkage content of the polymer made in the absence of a silane compound is plotted against the polymer Mooney viscosity.

Examples 8-12

In Examples 8-12, the polymerization of 1,3-butadiene was conducted in the presence of tetravinylsilane (TVS). The procedure was similar to that described in Example 1 except that a certain amount of TVS was added to the monomer solution prior to the addition of the preformed catalyst. The polymerization conditions and the properties of the resulting polymer are summarized in Table 2.

TABLE 2

| Example | 8 | 9 | 10 | 11 | 12 |
|---|---|---|---|---|---|
| Hexane (g) | 106 | 106 | 106 | 106 | 106 |
| 22.0% 1,3-Bd/hexane (g) | 227 | 227 | 227 | 227 | 227 |
| TVS (mmol) | 1.83 | 3.67 | 5.50 | 7.33 | 9.17 |
| Catalyst amount (mmol of Nd) | 0.0225 | 0.0225 | 0.0225 | 0.0225 | 0.0225 |
| Polymerization time (min.) | 60 | 60 | 60 | 60 | 60 |
| Polymer yield (%) | 94.8 | 95.2 | 94.6 | 94.2 | 92.8 |
| $ML_{1+4}$ | 34.2 | 31.2 | 28.5 | 27.5 | 26.6 |
| $M_n$ | 119,400 | 108,200 | 106,500 | 103,800 | 100,800 |
| $M_w$ | 230,400 | 224,000 | 218,300 | 218,000 | 217,700 |
| $M_n/M_w$ | 1.93 | 2.07 | 2.05 | 2.10 | 2.16 |
| cis-1,4-linkage (%) | 95.60 | 96.42 | 97.11 | 97.50 | 97.76 |
| trans-1,4-linkage (%) | 3.79 | 2.97 | 2.29 | 1.90 | 1.62 |
| 1,2-linkage (%) | 0.61 | 0.61 | 0.60 | 0.60 | 0.62 |

Figure 2:
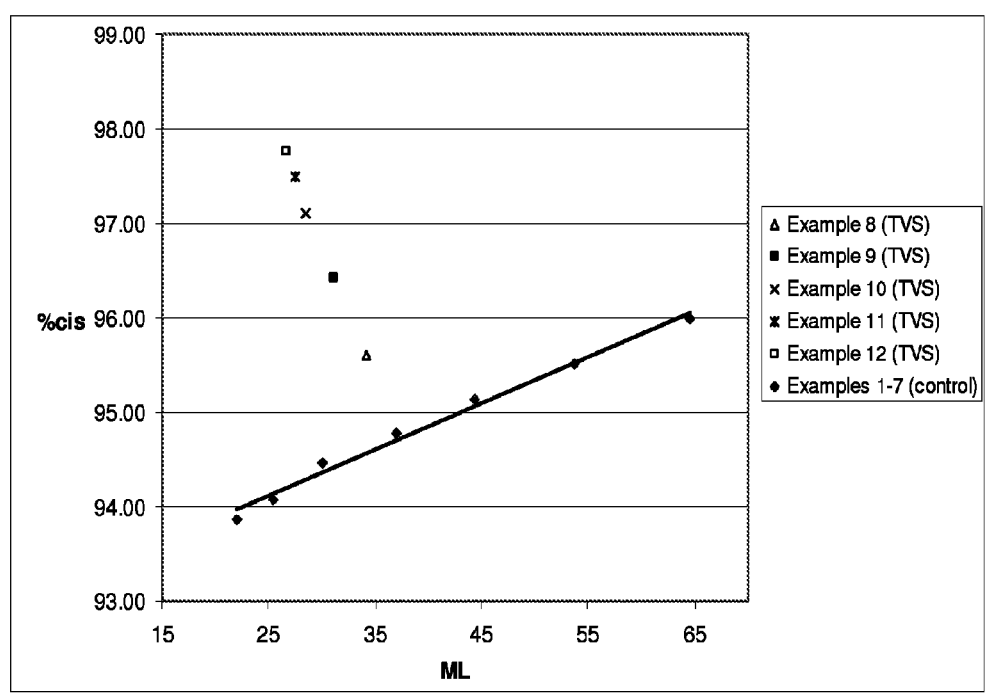
FIG. 2 is a graphical plot of the cis-1,4-linkage content versus Mooney viscosity ($ML_{1+4}$ @100° C.) for cis-1,4-polybutadiene polymer made in the presence of tetravinylsilane according to one or more embodiments of the present invention as compared to that of polymer made in the absence of a silane compound (i.e. those depicted in FIG. 1).

FIG. 2 gives a comparison of the cis-1,4-linkage content of the polymer made in the presence of TVS (Examples 8-12) with that of the polymer made in the absence of a silane compound (Examples 1-7). It is evident that the addition of TVS as a catalyst component in Examples 8-12 increases the cis-1,4-linkage content of the resulting cis-1,4-polybutadiene.

Examples 13-17

In Examples 13-17, the polymerization of 1,3-butadiene was conducted in the presence of trivinylmethylsilane (TVMS). The procedure was similar to that described in Example 1 except that a certain amount of TVMS was added to the monomer solution prior to the addition of the preformed catalyst. The polymerization conditions and the properties of the resulting polymer are summarized in Table 3.

TABLE 3

| Example | 13 | 14 | 15 | 16 | 17 |
|---|---|---|---|---|---|
| Hexane (g) | 106 | 106 | 106 | 106 | 106 |
| 22.0% 1,3-Bd/hexane (g) | 227 | 227 | 227 | 227 | 227 |
| TVMS (mmol) | 2.01 | 4.02 | 6.03 | 8.04 | 10.06 |
| Catalyst amount (mmol of Nd) | 0.0225 | 0.0225 | 0.0225 | 0.0225 | 0.0225 |
| Polymerization time (min.) | 60 | 60 | 60 | 60 | 60 |
| Polymer yield (%) | 96.0 | 95.2 | 96.2 | 95.8 | 96.0 |
| $ML_{1+4}$ | 29.4 | 26.4 | 25.3 | 23.3 | 23.1 |
| $M_n$ | 119,400 | 113,500 | 111,500 | 110,900 | 109,800 |
| $M_w$ | 224,500 | 219,500 | 217,800 | 213,600 | 218,100 |
| $M_n/M_w$ | 1.88 | 1.93 | 1.95 | 1.93 | 1.99 |
| cis-1,4-linkage (%) | 95.95 | 96.69 | 97.23 | 97.56 | 97.86 |
| trans-1,4-linkage (%) | 3.41 | 2.66 | 2.15 | 1.84 | 1.56 |
| 1,2-linkage (%) | 0.64 | 0.65 | 0.62 | 0.60 | 0.58 |

Figure 3:
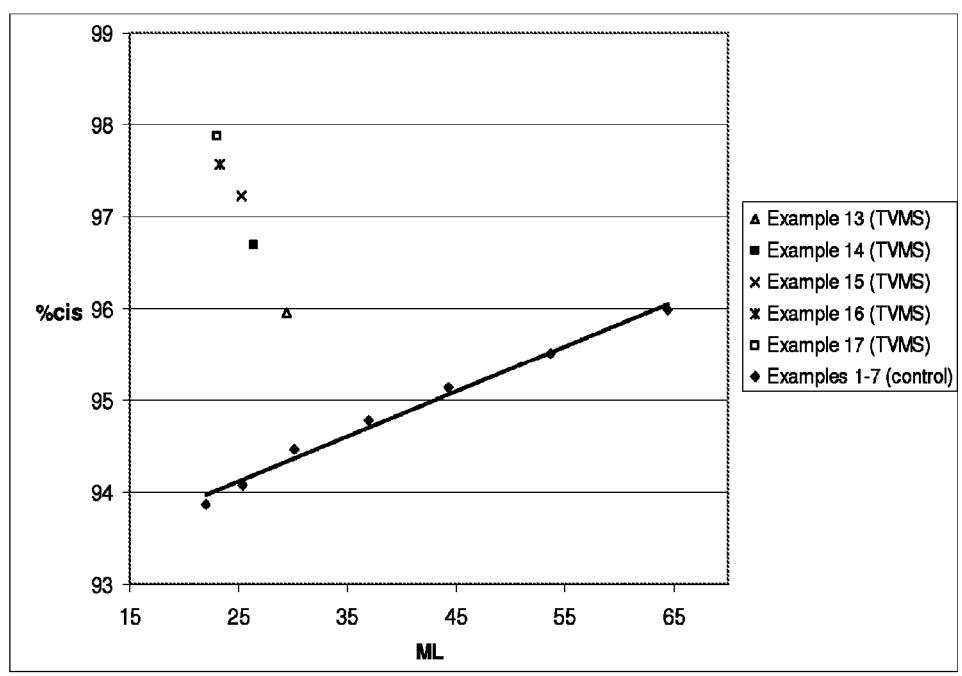
FIG. 3 is a graphical plot of the cis-1,4-linkage content versus Mooney viscosity ($ML_{1+4}$ @100° C.) for cis-1,4-polybutadiene polymer made in the presence of trivinylmethylsilane according to one or more embodiments of the present invention as compared to that of polymer made in the absence of a silane compound (i.e. those depicted in FIG. 1).

FIG. 3 gives a comparison of the cis-1,4-linkage content of the polymer made in the presence of TVMS (Examples 13-17) with that of the polymer made in the absence of a silane compound (Examples 1-7). It is evident that the addition of TVMS as a catalyst component in Examples 13-17 increases the cis-1,4-linkage content of the resulting cis-1,4-polybutadiene.

Examples 18-21

In Examples 18-21, the polymerization of 1,3-butadiene was conducted in the presence of divinyldimethylsilane (DVDMS). The procedure was similar to that described in Example 1 except that a certain amount of DVDMS was added to the monomer solution prior to the addition of the preformed catalyst. The polymerization conditions and the properties of the resulting polymer are summarized in Table 4.

TABLE 4

| Example | 18 | 19 | 20 | 21 |
| --- | --- | --- | --- | --- |
| Hexane (g) | 106 | 106 | 106 | 106 |
| 22.0% 1,3-Bd/hexane (g) | 227 | 227 | 227 | 227 |
| DVDMS (mmol) | 2.23 | 4.45 | 7.79 | 11.13 |
| Catalyst amount (mmol of Nd) | 0.0225 | 0.0225 | 0.0225 | 0.0225 |
| Polymerization time (min.) | 60 | 60 | 60 | 60 |
| Polymer yield (%) | 95.8 | 94.8 | 95.4 | 94.0 |
| $ML_{1+4}$ | 31.7 | 30.9 | 31.1 | 33.7 |
| $M_n$ | 127,200 | 127,500 | 123,300 | 126,100 |
| $M_w$ | 230,000 | 229,300 | 231,300 | 248,400 |
| $M_n/M_w$ | 1.81 | 1.80 | 1.88 | 1.97 |
| cis-1,4-linkage (%) | 95.55 | 96.02 | 96.77 | 97.38 |
| trans-1,4-linkage (%) | 3.83 | 3.35 | 2.60 | 1.99 |
| 1,2-linkage (%) | 0.62 | 0.63 | 0.63 | 0.63 |

Figure 4:
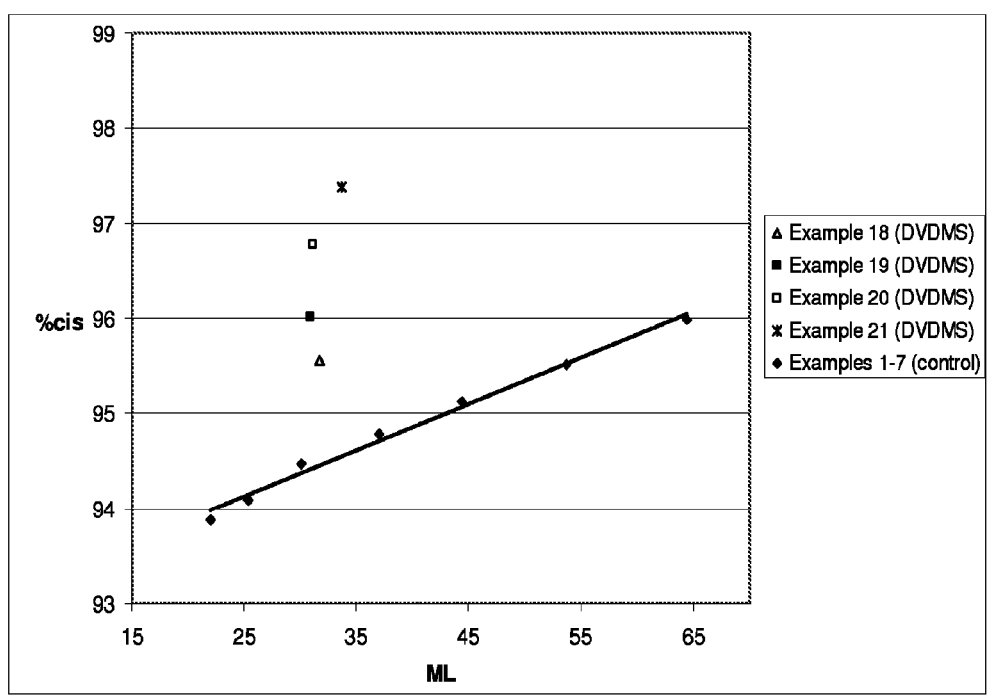
FIG. 4 is a graphical plot of the cis-1,4-linkage content versus Mooney viscosity ($ML_{1+4}$ @100° C.) for cis-1,4-polybutadiene polymer made in the presence of divinyldimethylsilane according to one or more embodiments of the present invention as compared to that of polymer made in the absence of a silane compound (i.e. those depicted in FIG. 1).

FIG. 4 gives a comparison of the cis-1,4-linkage content of the polymer made in the presence of DVDMS (Examples 18-21) with that of the polymer made in the absence of a silane compound (Examples 1-7). It is evident that the addition of DVDMS as a catalyst component in Examples 18-21 increases the cis-1,4-linkage content of the resulting cis-1,4-polybutadiene.

Examples 22-24

In Examples 22-24, the polymerization of 1,3-butadiene was conducted in the presence of tetraallylsilane (TAS). The procedure was similar to that described in Example 1 except that a certain amount of TAS was added to the monomer solution prior to the addition of the preformed catalyst. The polymerization conditions and the properties of the resulting polymer are summarized in Table 5.

TABLE 5

| Example | 22 | 23 | 24 |
| --- | --- | --- | --- |
| Hexane (g) | 106 | 106 | 106 |
| 22.0% 1,3-Bd/hexane (g) | 227 | 227 | 227 |
| TAS (mmol) | 3.90 | 5.20 | 6.50 |
| Catalyst amount (mmol of Nd) | 0.0225 | 0.0225 | 0.0225 |
| Polymerization time (min.) | 60 | 60 | 60 |
| Polymer yield (%) | 96.2 | 95.8 | 96.0 |
| $ML_{1+4}$ | 44.6 | 51.0 | 57.0 |
| $M_n$ | 135,500 | 140,600 | 147,000 |
| $M_w$ | 268,290 | 286,824 | 313,100 |
| $M_n/M_w$ | 1.98 | 2.04 | 2.13 |
| cis-1,4-linkage (%) | 96.42 | 96.89 | 97.47 |

TABLE 5-continued

| Example | 22 | 23 | 24 |
| --- | --- | --- | --- |
| trans-1,4-linkage (%) | 2.92 | 2.45 | 1.89 |
| 1,2-linkage (%) | 0.66 | 0.66 | 0.64 |

Figure 5:
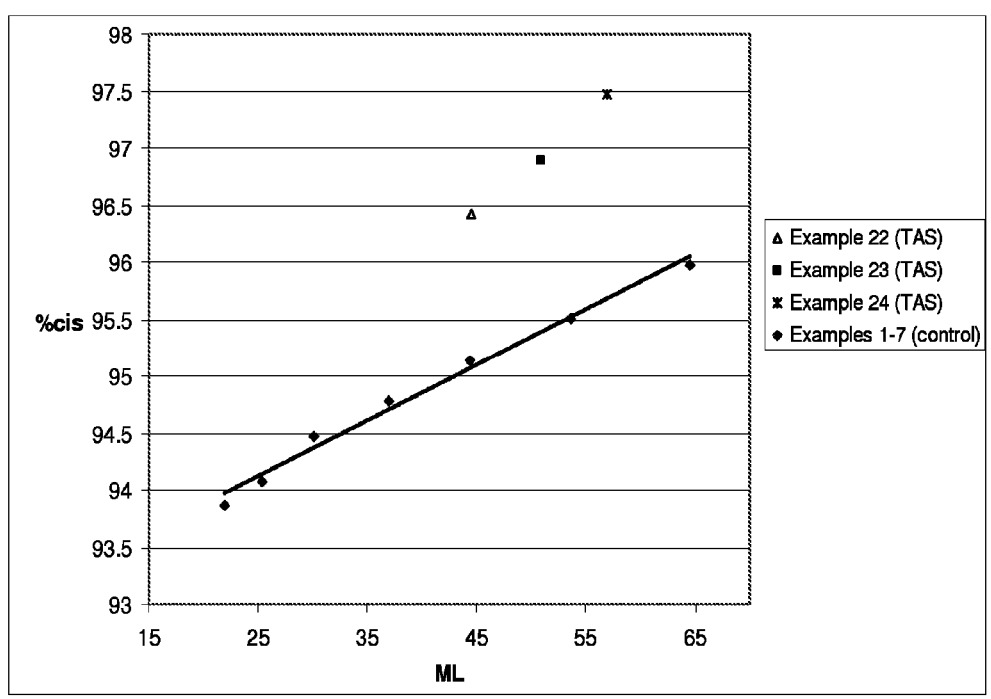
FIG. 5 is a graphical plot of the cis-1,4-linkage content versus Mooney viscosity ($ML_{1+4}$ @100° C.) for cis-1,4-polybutadiene polymer made in the presence of tetraallylsilane according to one or more embodiments of the present invention as compared to that of polymer made in the absence of a silane compound (i.e. those depicted in FIG. 1).

FIG. 5 gives a comparison of the cis-1,4-linkage content of the polymer made in the presence of TAS (Examples 22-24) with that of the polymer made in the absence of a silane compound (Examples 1-7). It is evident that the addition of TAS as a catalyst component in Examples 22-24 increases the cis-1,4-linkage content of the resulting cis-1,4-polybutadiene.

Examples 25 and 26

In Examples 25 and 26, the polymerization of 1,3-butadiene was conducted in the presence of 1,1,3,3-tetravinyldimethyldisiloxane (TVDMDSO). The procedure was similar to that described in Example 1 except that a certain amount of TVDMDSO was added to the monomer solution prior to the addition of the preformed catalyst. The polymerization conditions and the properties of the resulting polymer are summarized in Table 6.

TABLE 6

| Example | 25 | 26 |
| --- | --- | --- |
| Hexane (g) | 106 | 106 |
| 22.0% 1,3-Bd/Hexane (g) | 227 | 227 |
| TVDMDSO (mmol) | 0.225 | 0.45 |
| Catalyst amount (mmol of Nd) | 0.0225 | 0.0225 |
| Polymerization time (min.) | 60 | 60 |
| Polymer yield (%) | 96.6 | 97.0 |
| $ML_{1+4}$ | 32.8 | 28.8 |
| $M_n$ | 117,800 | 111,300 |
| $M_w$ | 234,400 | 224,800 |
| $M_n/M_w$ | 1.99 | 2.02 |
| cis-1,4-linkage (%) | 95.80 | 96.73 |
| trans-1,4-linkage (%) | 3.58 | 2.67 |
| 1,2-linkage (%) | 0.62 | 0.60 |

Figure 6:
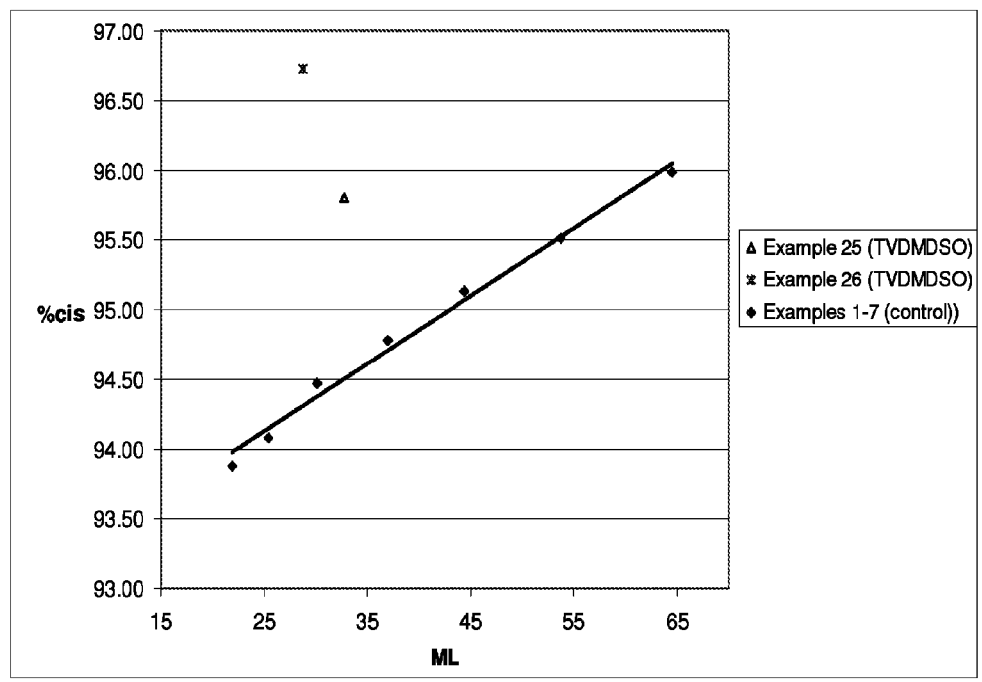
FIG. 6 is a graphical plot of the cis-1,4-linkage content versus Mooney viscosity ($ML_{1+4}$ @100° C.) for cis-1,4-polybutadiene polymer made in the presence of 1,1,3,3-tetravinyldimethyldisiloxane according to one or more embodiments of the present invention as compared to that of polymer made in the absence of a silane compound (i.e. those depicted in FIG. 1).

FIG. 6 gives a comparison of the cis-1,4-linkage content of the polymer made in the presence of TVDMDSO (Examples 25 and 26) with that of the polymer made in the absence of a silane compound (Examples 1-7). It is evident that the addition of TVDMDSO as a catalyst component in Examples 25 and 26 increases the cis-1,4-linkage content of the resulting cis-1,4-polybutadiene.

Examples 27 and 28

In Examples 27 and 28, the polymerization of 1,3-butadiene was conducted in the presence of 1,3-divinyltetramethyldisiloxane (DVTMDSO). The procedure was similar to that described in Example 1 except that a certain amount of DVTMDSO was added to the monomer solution prior to the addition of the preformed catalyst. The polymerization conditions and the properties of the resulting polymer are summarized in Table 7.

TABLE 7

| Example | 27 | 28 |
| --- | --- | --- |
| Hexane (g) | 106 | 106 |
| 22.0% 1,3-Bd/Hexane (g) | 227 | 227 |
| DVTMDSO (mmol) | 0.225 | 0.45 |

TABLE 7-continued

| Example | 27 | 28 |
|---|---|---|
| Catalyst amount (mmol of Nd) | 0.0225 | 0.0225 |
| Polymerization time (min.) | 60 | 60 |
| Polymer yield (%) | 97.0 | 96.2 |
| ML$_{1+4}$ | 23.4 | 20.3 |
| M$_n$ | 108,900 | 97,700 |
| M$_w$ | 213,400 | 204,200 |
| M$_n$/M$_w$ | 1.96 | 2.09 |
| cis-1,4-linkage (%) | 94.97 | 95.75 |
| trans-1,4-linkage (%) | 4.39 | 3.65 |
| 1,2-linkage (%) | 0.64 | 0.60 |

Figure 7:
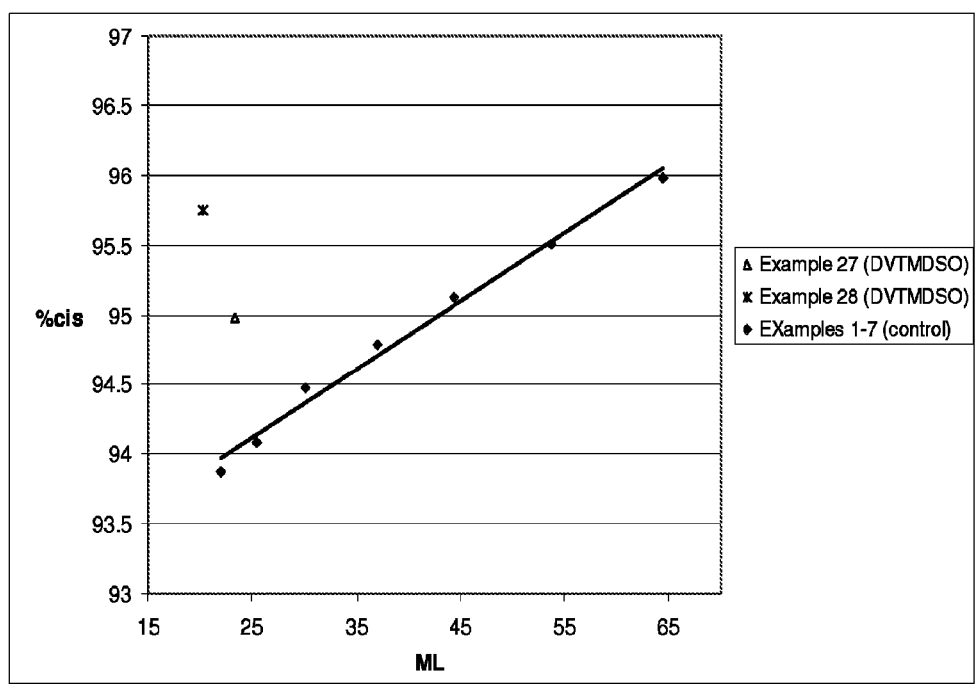
FIG. 7 is a graphical plot of the cis-1,4-linkage content versus Mooney viscosity ($ML_{1+4}$ @100° C.) for cis-1,4-polybutadiene polymer made in the presence of 1,3-divinyltetramethyldisiloxane according to one or more embodiments of the present invention as compared to that of polymer made in the absence of a silane compound (i.e. those depicted in FIG. 1).

FIG. 7 gives a comparison of the cis-1,4-linkage content of the polymer made in the presence of DVTMDSO (Examples 27 and 28) with that of the polymer made in the absence of a silane compound (Examples 1-7). It is evident that the addition of DVTMDSO as a catalyst component in Examples 27 and 28 increases the cis-1,4-linkage content of the resulting cis-1,4-polybutadiene.

Various modifications and alterations that do not depart from the scope and spirit of this invention will become apparent to those skilled in the art. This invention is not to be duly limited to the illustrative embodiments set forth herein.

What is claimed is:

1. A process for preparing a polydiene, the process comprising the step of:
polymerizing conjugated diene monomer with a lanthanide-based catalyst system in the presence of a silane compound defined by the formula $$Si\omega_x\theta_{4-x}$$

where each ω is independently a vinyl group, a substituted vinyl group, an allyl group, or a substituted allyl group, each θ is independently a hydrogen atom or a monovalent organic, or two or more θ groups may join to form a polyvalent organic group, and x is an integer from 1 to 4, where ω and θ do not include a halogen atom.

2. The process of claim 1, where the silane compound is a vinylsilane selected from the group consisting of vinyldimethylsilane, vinyltrimethylsilane, vinyltriethylsilane, vinyltriphenylsilane, vinyl-t-butyldimethylsilane, vinyl-di-n-octylmethylsilane, vinylphenylmethylsilane, vinylphenyldimethylsilane, divinyldimethylsilane, trivinylsilane, trivinylmethylsilane, tetravinylsilane, tris(vinyldimethylsiloxy)methylsilane, tris(vinyldimethylsiloxy)phenylsilane, vinyldimethylmethoxysilane, vinylphenylmethylmethoxysilane, vinyldimethylethoxysilane, vinyldiphenylethoxysilane, vinylmethyldimethoxysilane, vinylmethyldiethoxysilane, vinylphenyldiethoxysilane, vinyltrimethoxysilane, vinyltriethoxysilane, vinyltriisopropoxysilane, vinyltri-t-butoxysilane, vinyltriisopropenoxysilane, vinyltriphenoxysilane, vinyltris(2-methoxyethoxy)silane,vinyltris(methoxypropoxy)silane, trivinylmethoxysilane, trivinylethoxysilane, vinylsilatrane, vinylmethylbis(trimethylsiloxy)silane, vinyltris(dimethylsiloxy)silane, vinyltris(trimethylsiloxy)silane, tetrakis(vinyldimethylsiloxy)silane, vinylmethyldiacetoxysilane, vinyltriacetoxysilane, vinylmethylbis(dimethylamino)silane, 2-propenyltrimethylsilane, (1-methoxyvinyl)trimethylsilane, vinylmethylsilacyclopentane, vinyltetramethyldisiloxane, vinylpentamethyldisiloxane, 1,3-divinyltetramethyldisiloxane, 1,3-divinyl -1,3-diphenyl-1,3-dimethyldisiloxane, 1,3-divinyltetraphenyldisiloxane, 1,1,3,3-tetravinyldimethyldisiloxane, 1,3-divinyltetraethoxydisiloxane, 1,3-divinyltetrakis(trimethylsiloxy) disiloxane, 1,2-divinyltetramethyldisilane, 1,4-divinyltetramethyldisilylethane, 1,4-bis(vinyldimethylsilyl)benzene, tris(vinyldimethylsilyl)borate, 1,5-divinylhexamethyltrisiloxane, 1,5-divinyl-3-phenylpentamethyltrisiloxane, 1,5-divinyl-3,3-diphenyl -1,1,5,5-tetramethyltrisiloxane, 1,3,5-trivinyl-1,1,3,5,5-pentamethyltrisiloxane, 1,3,5-trivinyl-1,3,5-trimethylcyclotrisiloxane, 1,3,5,7-tetravinyl-1,3,5,7-tetramethylcyclotetrasiloxane, and octavinyl-T8-silsesquioxane.

3. The process of claim 1, where the silane compound is an allylsilane selected from the group consisting of allyldimethylsilane, allyltrimethylsilane, allyltriisopropylsilane, allyltriphenylsilane, diallyldimethylsilane, diallyldiphenylsilane, triallylmethylsilane, tetraallylsilane, allyldimethoxysilane, allyltrimethoxysilane, allyltriethoxysilane, allyltriphenoxysilane, allyltris(trimethylsiloxy)silane, allyldimethyl(diisopropylamino)silane, 1,1-bis(trimethylsilylmethyl)ethylene, 1,1-bis(trimethoxysilylmethyl)ethylene, methallyltrimethylsilane, 1-allyl-1,1,3,3-tetramethyldisiloxane, 1,3-diallyltetramethyldisiloxane, and 1,3-diallyltetrakis(trimethylsiloxy) disiloxane.

4. The process of claim 1, where the silane compound is an allylvinylsilane selected from the group consisting of allylvinylmethylsilane, allylvinylphenylsilane, allylvinyldimethylsilane, allylvinyldiphenylsilane, allyltrivinylsilane, diallyldivinylsilane, triallylvinylsilane, allylvinyldimethoxysilane, allylvinyldiethoxysilane, allylvinyldiphenoxysilane, allylvinylbis(trimethylsiloxy)silane, allylvinyldiacetoxysilane, and allylvinylbis(dimethylamino)silane.

5. The process of claim 1, 2, 3, or 4, where the lanthanide-based catalyst system is a combination of or reaction product of (a) a lanthanide compound, (b) an alkylating agent, and (c) a halogen source.

6. The process of claim 1, where the silane compound is a vinylsilane defined by the formula $$Si(C\theta=C\theta_2)_x\theta_{4-x}$$

where each θ is independently a hydrogen atom or a monovalent organic, or two or more θ groups may join to form a polyvalent organic group, and x is an integer from 1 to 4.

7. The process of claim 6, where the vinylsilane is defined by the formula $$Si(CH=CH_2)_x\theta_{4-x}$$

where each θ is independently a hydrogen atom or a monovalent organic, or two or more θ groups may join to form a polyvalent organic group, and x is an integer from 1 to 4.

8. The process of claim 1, where the silane compound is an allyl silane defined by the formula $$Si(C\theta_2C\theta=C\theta_2)_x\theta_{4-x}$$

where each θ is independently hydrogen atom, a halogen atom, or a monovalent organic, or two or more θ groups may join to form a polyvalent organic group, and x is an integer from 1 to 4.

9. The process of claim 8, where the allylsilane is defined by the formula $$Si(CH_2CH=CH_2)_x\theta_{4-x}$$

where each θ is independently hydrogen or a monovalent organic, or two or more θ groups may join to form a polyvalent organic group, and x is an integer from 1 to 4.

10. The process of claim 1, where the silane compound is an allylvinylsilane defined by the formula $$Si(C\theta_2C\theta=C\theta_2)_x(C\theta=C\theta_2)_y\theta_z$$

where each θ is independently a hydrogen atom or a monovalent organic, or two or more θ groups may join to form a polyvalent organic group, x is an integer from 1 to 3, y is an integer from 1 to 3, z is an integer from 0 to 2, and the sum of x, y, and z is 4.

11. The process of claim 10, where the allylvinylsilane is defined by the formula $$Si(CH_2CH=CH_2)_x(CH=CH_2)_y\theta_z$$

where each θ is independently a hydrogen atom, or a monovalent organic, or two or more θ groups may join to form a polyvalent organic group, x is an integer from 1 to 3, y is an integer from 1 to 3, z is an integer from 0 to 2, and the sum of x, y, and z is 4.

12. The process of claim 1, where each θ is a monovalent organic group selected from the group consisting of hydrocarbyl, substituted hydrocarbyl, hydrocarbyloxy, substituted hydrocarbyloxy, carboxylate, substituted carboxylate, silyl, substituted silyl, silyloxy, substituted silyloxy, and protected amino groups.

13. The process of claim 5, where the alkylating agent includes both (i) an organoaluminum compound defined by the formula AlR$_n$X$_3$-n, where each R independently is a monovalent organic group that is attached to the aluminum atom via a carbon atom, where each X independently is a hydrogen atom, a halogen atom, a carboxylate group, an alkoxide group, or an aryloxide group, and where n is an integer in the range of from 1 to 3, and (ii) an aluminoxane.

14. The process of claim 5, where the molar ratio of the silane compound to the lanthanide compound is from about 1:1 to about 700:1.

15. The process of claim 1, where said step of polymerizing takes place within a solvent, where the solvent includes monomer to be polymerized or where the solvent includes an organic compound that will not undergo polymerization or incorporation into the polydiene.

16. The process of claim 1, where said process is a solution polymerization or a bulk polymerization.

17. The process of claim 12, where the hydrocarbyl group is selected from the group consisting of alkyl, cycloalkyl, alkenyl, cycloalkenyl, aryl, allyl, aralkyl, alkaryl, and alkynyl groups, where the hydrocarbyloxy group is selected from the group consisting of alkyloxy, cycloalkyloxy, alkenyloxy, cycloalkenyloxy, aryloxy, allyloxy, aralkyloxy, alkaryloxy, and alkynyloxy groups, where the carboxylic group is selected from the group consisting of alkanecarboxylate, cycloalkanecarboxylate, alkenecarboxylate, cycloalkenecarboxylate, arenecarboxylate, alkynecarboxylate, and cycloalkynecarboxylate groups, where the silyl group is selected from the group consisting of trihydrocarbylsilyl, trisilyloxysilyl, trihydrocarbyloxysilyl, trisilylsilyl, dihydrocarbylhydrosilyl, dihydrocarbyl(silyloxy)silyl, dihydrocarbyl(silyl)silyl, dihydrocarbyl(hydrocarbyloxy)carbyloxy)silyl, hydrocarbyldihydrosilyl, hydrocarbyl(disilyloxy)silyl, hydrocarbyl(disilyl)silyl, and hydrocarbyl(dihydrocarbyloxy)silyl groups, and where the silyloxy group is selected from the group consisting of trihydrocarbylsilyloxy, trihydrocarbyloxysilyloxy, trisilyloxysilyloxy, trisilylsilyloxy, dihydrocarbylhydrosilyloxy, dihydrocarbyl(silyloxy)silyloxy, dihydrocarbyl(silyl)silyloxy, dihydrocarbyl(hydrocarbyloxy)carbyloxy)silyloxy, hydrocarbyldihydrosilyloxy, hydrocarbyl(disilyloxy)silyloxy, hydrocarbyl(disilyl)silyloxy, and hydrocarbyl(dihydrocarbyloxy)silyloxy groups.

18. The process of claim 1, where the process takes place at a pressure where a majority of the monomer is in the liquid phase.

19. A process for preparing a polydiene, the process comprising the step of polymerizing conjugated diene monomer with a lanthanide-based catalyst system in the presence of a a vinylsilane selected from the group consisting of vinyldimethylsilane, vinyltrimethylsilane, vinyltriethylsilane, vinyltriphenylsilane, vinyl-t-butyldimethylsilane, vinyl-di-n-octylmethylsilane, vinylphenylmethylsilane, vinylphenyldimethylsilane, divinyldimethylsilane, trivinylsilane, trivinylmethylsilane, tetravinylsilane, tris(vinyldimethylsiloxy)methylsilane, tris(vinyldimethylsiloxy)phenylsilane, vinyldimethylmethoxysilane, vinylphenylmethylmethoxysilane, vinyldimethylethoxysilane, vinyldiphenylethoxysilane, vinylmethyldimethoxysilane, vinylmethyldiethoxysilane, vinylphenyldiethoxysilane, vinyltrimethoxysilane, vinyltriethoxysilane, vinyltriisopropoxysilane, vinyltri-t-butoxysilane, vinyltriisopropenoxysilane, vinyltriphenoxysilane, vinyltris(2-methoxyethoxy)silane, vinyltris(methoxypropoxy)silane, trivinylmethoxysilane, trivinylethoxysilane, vinylsilatrane, vinylmethylbis(trimethylsiloxy)silane, vinyltris(dimethylsiloxy)silane, vinyltris(trimethylsiloxy)silane, tetrakis(vinyldimethylsiloxy)silane, vinylmethyldiacetoxysilane, vinyltriacetoxysilane, vinylmethylbis(dimethylamino)silane, 2-propenyltrimethylsilane, (1-methoxyvinyl)trimethylsilane, vinylmethylsilacyclopentane, vinyltetramethyldisiloxane, vinylpentamethyldisiloxane, 1,3-divinyltetramethyldisiloxane, 1,3-divinyl-1,3-diphenyl-1,3-dimethyldisiloxane, 1,3-divinyltetraphenyldisiloxane, 1,1,3,3-tetravinyldimethyldisiloxane, 1,3-divinyltetraethoxydisiloxane, 1,3-divinyltetrakis (trimethylsiloxy) disiloxane, 1,2-divinyltetramethyldisilane, 1,4-divinyltetramethyldisilylethane, 1,4-bis(vinyldimethylsilyl)benzene, tris(vinyldimethylsilyl)borate, 1,5-divinylhexamethyltrisiloxane, 1,5-divinyl-3-phenylpentamethyltrisiloxane, 1,5-divinyl-3,3-diphenyl-1,1,5,5-tetramethyltrisiloxane, 1,3,5-trivinyl-1,1,3,5,5-pentamethyltrisiloxane, 1,3,5-trivinyl-1,3,5-trimethylcyclotrisiloxane, 1,3,5,7-tetravinyl-1,3,5,7-tetramethylcyclotetrasiloxane, and octavinyl-T8-silsesquioxane.

20. A process for preparing a polydiene, the process comprising the step of:
polymerizing conjugated diene monomer with a lanthanide-based catalyst system in the presence of a silane compound defined by the formula $$Si\omega_x\theta_{4-x}$$

where each ω is independently a vinyl group, a substituted vinyl group, an allyl group, or a substituted allyl group, each θ is independently a hydrogen atom or a monovalent organic, or two or more θ groups may join to form a polyvalent organic group, and x is an integer from 1 to 4, where the lanthanide-based catalyst system is a combination of or reaction product of (a) a lanthanide compound, (b) an alkylating agent, and (c) a halogen source, where ω and θ do not include a halogen atom.

21. The process of claim 20, where the silane compound is a vinylsilane defined by the formula $$Si(C\theta=C\theta_2)_x\theta_{4-x}$$

where each θ is independently a hydrogen atom, a halogen atom, or a monovalent organic, or two or more θ groups may join to form a polyvalent organic group, and x is an integer from 1 to 4.

22. The process of claim 21, where the vinylsilane is defined by the formula $$Si(CH=CH_2)_x\theta_{4-x}$$

where each θ is independently a hydrogen atom or a monovalent organic, or two or more θ groups may join to form a polyvalent organic group, and x is an integer from 1 to 4.

23. The process of claim 20, where the silane compound is an allyl silane defined by the formula $$Si(C\theta_2C\theta=C\theta_2)_x\theta_{4-x}$$

where each θ is independently hydrogen atom or a monovalent organic, or two or more θ groups may join to form a polyvalent organic group, and x is an integer from 1 to 4.

24. The process of claim 23, where the allylsilane is defined by the formula $$Si(CH_2CH=CH_2)_x\theta_{4-x}$$

where each θ is independently hydrogen atom or a monovalent organic, or two or more θ groups may join to form a polyvalent organic group, and x is an integer from 1 to 4.

25. The process of claim 20, where the silane compound is an allylvinylsilane defined by the formula $$Si(C\theta_2C\theta=C\theta_2)_x(C\theta=C\theta_2)_y\theta_z$$

where each θ is independently a hydrogen atom or a monovalent organic, or two or more θ groups may join to form a polyvalent organic group, x is an integer from 1 to 3, y is an integer from 1 to 3, z is an integer from 0 to 2, and the sum of x, y, and z is 4.

26. The process of claim 25, where the allylvinylsilane is defined by the formula $$Si(CH_2CH=CH_2)_x(CH=CH_2)_y\theta_z$$

where each θ is independently a hydrogen atom or a monovalent organic, or two or more θ groups may join to form a polyvalent organic group, x is an integer from 1 to 3, y is an integer from 1 to 3, z is an integer from 0 to 2, and the sum of x, y, and z is 4.

* * * * *